US008251380B2

(12) United States Patent
Liu

(10) Patent No.: US 8,251,380 B2
(45) Date of Patent: Aug. 28, 2012

(54) FOLDABLE WALKER APPARATUS

(75) Inventor: Julian Liu, Port Moody (CA)

(73) Assignee: Evolution Technologies Inc., Port Coquitlam (CA)

( * ) Notice: Subject to any disclaimer, the term of this patent is extended or adjusted under 35 U.S.C. 154(b) by 0 days.

(21) Appl. No.: 13/276,518

(22) Filed: Oct. 19, 2011

(65) Prior Publication Data

US 2012/0032407 A1 Feb. 9, 2012

Related U.S. Application Data

(62) Division of application No. 12/247,781, filed on Oct. 8, 2008.

(51) Int. Cl.

| | |
|---|---|
| ***B62B 3/00*** | (2006.01) |
| ***A61H 3/04*** | (2006.01) |
| ***F16D 65/14*** | (2006.01) |
| ***B62B 5/04*** | (2006.01) |
| ***B60T 1/04*** | (2006.01) |

(52) U.S. Cl. ......... 280/47.34; 135/67; 135/74; 188/2 D; 188/19; 188/29; 188/22 2 F

(58) Field of Classification Search .................. 280/639, 280/645, 646, 42, 651, 47.34; 188/2 D, 19–21, 188/29, 24.22, 30, 31, 2 F, 68, 69; 135/67, 135/74

See application file for complete search history.

(56) References Cited

U.S. PATENT DOCUMENTS

| | | | |
|---|---|---|---|
| 188,835 | A | 3/1877 | Allen |
| 291,351 | A | 1/1884 | Jackson |
| 2,631,655 | A | 3/1953 | Jannello |
| 2,656,881 | A | 10/1953 | Hamilton |
| 2,866,495 | A | 12/1958 | Diehl et al. |
| 3,018,506 | A | 1/1962 | Haydock |
| 3,061,049 | A | 10/1962 | Bramley |
| 3,288,250 | A | 11/1966 | Oja et al. |
| 3,903,944 | A | 9/1975 | Montgomery et al. |
| 4,029,311 | A | 6/1977 | Chanslor et al. |

(Continued)

FOREIGN PATENT DOCUMENTS

CA 2285305 A1 10/1998

(Continued)

OTHER PUBLICATIONS

Caster, http://en.wikipedia.org/wiki/Caster.

(Continued)

*Primary Examiner* — John R Olszewski
(74) *Attorney, Agent, or Firm* — Cameron IP

(57) ABSTRACT

There is provided a walker apparatus having a brake, a braking handle, a brake wire, a brake rod, and a brake rod assembly. A gripping member connects to the brake wire. The gripping member includes a plate having a first end, a second end and an aperture near the second end. The plate connects to the brake wire near the first end and the plate slidably receives the brake rod through the aperture near the second end. The gripping member includes a clamp that engages the brake wire via a set screw. The gripping member is spring-biased to remain free of the brake rod in a non-actuated mode. When the braking handle actuates the brake wire, the plate tilts with the first end elevating relative to the second end, thereby causing the plate to engage with and abut the brake rod for thereby actuating the brake rod to brake.

9 Claims, 24 Drawing Sheets

U.S. PATENT DOCUMENTS

| | | | | | |
|---|---|---|---|---|---|
| 4,261,561 | A | | 4/1981 | Ilon | |
| 4,384,713 | A | * | 5/1983 | Deutsch et al. | 482/68 |
| 4,414,702 | A | | 11/1983 | Neumann | |
| 4,449,750 | A | | 5/1984 | Pultman | |
| 4,509,662 | A | | 4/1985 | Weiss | |
| 4,572,409 | A | | 2/1986 | Finnegan | |
| 4,659,099 | A | | 4/1987 | Malone | |
| 4,676,416 | A | | 6/1987 | Harmon | |
| 4,765,644 | A | | 8/1988 | Bell | |
| 4,800,991 | A | | 1/1989 | Miller | |
| 4,907,794 | A | | 3/1990 | Rose | |
| 4,974,760 | A | | 12/1990 | Miller | |
| 5,012,963 | A | | 5/1991 | Rosenbaum | |
| 5,046,748 | A | | 9/1991 | Oat-Judge | |
| 5,279,180 | A | | 1/1994 | Henriksson | |
| 5,294,027 | A | | 3/1994 | Plastina | |
| 5,348,336 | A | | 9/1994 | Fernie et al. | |
| 5,356,237 | A | | 10/1994 | Sung | |
| 5,465,986 | A | | 11/1995 | MacRae | |
| 5,482,189 | A | | 1/1996 | Dentler et al. | |
| 5,531,238 | A | | 7/1996 | Azzarelli et al. | |
| 5,662,342 | A | | 9/1997 | Basharat | |
| 5,687,984 | A | | 11/1997 | Samuel | |
| 5,813,582 | A | | 9/1998 | Wright | |
| 5,865,065 | A | | 2/1999 | Chiu | |
| 5,896,779 | A | | 4/1999 | Bierstecker et al. | |
| 5,901,891 | A | | 5/1999 | Douglass | |
| 5,927,441 | A | * | 7/1999 | Luo | 188/19 |
| 5,953,962 | A | | 9/1999 | Hewson | |
| 5,954,161 | A | | 9/1999 | Lee | |
| 6,032,765 | A | | 3/2000 | Hsi-Chia | |
| 6,079,290 | A | | 6/2000 | Li | |
| 6,098,487 | A | | 8/2000 | Chien | |
| 6,099,002 | A | | 8/2000 | Uchiyama | |
| 6,142,526 | A | | 11/2000 | Katz | |
| 6,192,772 | B1 | | 2/2001 | Huang | |
| 6,202,502 | B1 | | 3/2001 | Chung-Che | |
| 6,216,825 | B1 | | 4/2001 | Hung | |
| 6,283,484 | B1 | | 9/2001 | Malmstrom | |
| 6,296,261 | B1 | | 10/2001 | deGoma | |
| 6,296,263 | B1 | | 10/2001 | Schultz et al. | |
| 6,338,355 | B1 | * | 1/2002 | Cheng | 135/67 |
| 6,354,619 | B1 | | 3/2002 | Kim | |
| 6,364,070 | B1 | | 4/2002 | Chen | |
| 6,371,142 | B1 | | 4/2002 | Battiston | |
| 6,386,575 | B1 | | 5/2002 | Turner | |
| 6,442,797 | B1 | | 9/2002 | Yang et al. | |
| 6,491,318 | B1 | | 12/2002 | Galt et al. | |
| 6,494,469 | B1 | * | 12/2002 | Hara et al. | 280/87.041 |
| 6,647,825 | B1 | | 11/2003 | Lin | |
| 6,651,994 | B2 | | 11/2003 | Hallgrimsson et al. | |
| 6,659,478 | B2 | | 12/2003 | Hallgrimsson et al. | |
| 6,755,285 | B1 | | 6/2004 | Wu | |
| D501,432 | S | | 2/2005 | Moller | |
| 6,877,519 | B2 | | 4/2005 | Fink | |
| 7,090,239 | B2 | | 8/2006 | Yoshie et al. | |
| 7,108,004 | B2 | | 9/2006 | Cowie et al. | |
| 7,219,906 | B2 | | 5/2007 | Hallgrimsson et al. | |
| 7,306,246 | B2 | | 12/2007 | Gale | |
| 7,410,179 | B2 | * | 8/2008 | Lonkvist | 280/47.371 |
| 7,494,138 | B2 | | 2/2009 | Graham | |
| 7,828,305 | B2 | | 11/2010 | Meyers et al. | |
| 2002/0079663 | A1 | | 6/2002 | Hallgrimsson et al. | |
| 2003/0010368 | A1 | | 1/2003 | MacKinnon | |
| 2005/0121481 | A1 | | 6/2005 | Chiu | |
| 2005/0156395 | A1 | | 7/2005 | Bohn | |
| 2005/0211285 | A1 | | 9/2005 | Cowie et al. | |
| 2007/0170699 | A1 | | 7/2007 | Li et al. | |
| 2007/0235067 | A1 | | 10/2007 | Gale et al. | |
| 2007/0267054 | A1 | | 11/2007 | Meyers et al. | |
| 2007/0278271 | A1 | | 12/2007 | Koren | |
| 2007/0278768 | A1 | | 12/2007 | Lynam | |
| 2008/0079230 | A1 | | 4/2008 | Graham | |
| 2008/0111349 | A1 | | 5/2008 | Willis | |
| 2008/0129016 | A1 | | 6/2008 | Willis | |
| 2008/0174084 | A1 | | 7/2008 | Gee | |

FOREIGN PATENT DOCUMENTS

| | | | |
|---|---|---|---|
| CA | 2352801 | A1 | 6/2000 |
| CA | 2329485 | A1 | 6/2002 |
| CA | 2513558 | A1 | 9/2004 |
| CA | 2492392 | A1 | 9/2005 |
| DE | 1396227 | | 6/1975 |
| DE | 4328875 | C1 | 2/1995 |
| DE | 298 18 710 | U1 | 10/1999 |
| GB | 23483 | | 0/1913 |
| GB | 365901 | | 1/1932 |
| GB | 984025 | | 2/1965 |
| GB | 2180508 | A | 4/1987 |
| JP | 10-291401 | | 11/1998 |
| NL | 1022512 | C | 8/2004 |
| WO | WO 92/06661 | | 4/1992 |
| WO | WO98/51557 | | 11/1998 |
| WO | WO 02/22070 | | 3/2002 |

OTHER PUBLICATIONS

US 7,364,173, 04/2008, Meyers et al. (withdrawn)

* cited by examiner

FOLDABLE WALKER APPARATUS

CROSS REFERENCE TO RELATED APPLICATION

This application is a divisional of U.S. patent application Ser. No. 12/247,781 filed in the United States Patent and Trademark Office on Oct. 8, 2008, the disclosure of which is incorporated herein by reference and priority to which is claimed.

BACKGROUND OF THE INVENTION

1. Field of the Invention

The present invention relates to a foldable walker apparatus. More particularly, it relates to a foldable walker apparatus having a variety of optimized features relating to its folding mechanism, braking pad mechanism and brake housing, brake rod assembly, frame shape and collapsible basket.

2. Description of the Related Art

It is known to have foldable walkers. However, much of the prior art discloses walkers that require many parts and this may lead to additional manufacturing costs. On the other hand, some walkers have fewer parts but may suffer from a lack of robustness and rigidity, particularly in the lateral direction. This may lead to a compromise in the safety of such devices. Some walkers in their folded states remain bulky and difficult to manage. Still further known walkers suffer from having many parts that may tangle with one's clothing.

There are a great variety of frame shapes for walkers. In order to accommodate the variety of body shapes and circumstances that a user of walkers may encounter, a strong frame is needed. This has led to frames that have many parts, which may lead to further manufacturing costs. Alternatively, this has led to frames that are square or rounded-square in profile which are thicker and/or made of heavy duty metals. Such features may lead to a heavier, less manageable and therefore less enjoyable walker.

Many foldable walkers include baskets. However oftentimes these baskets need to be removed before the foldable walkers may be folded. Alternatively, many of these baskets require the foldable walker to fold from front to back. This may compromise the strength and rigidity of the frame of the foldable walker. Also, many of the baskets for walkers require many parts. This may act to increase manufacturing costs.

A variety of walkers have a housing over the brake pad mechanisms. However oftentimes this housing only partially extends over the brake pad. Even if the brake pad is covered by a housing, often the connecting and adjusting means for adjusting the brake pad protrudes outwards or is exposed for the user to adjust. As a result, some walkers of the prior art have brake pad mechanisms that are more prone to getting entangled with the user of the walker, which may lead to a great inconvenience and a safety concern for the user. Moreover, such walkers are more prone to breaking, and wear and tear, including damage such as thread-stripping of the connecting and adjusting means for the brake pad. This may lead to the considerable inconvenience, and extra expense to the user, or a premature need to replace the brake pad mechanism. It may also lead to a further compromised safety to the user if as a result the walker no longer brakes.

The use of a brake rod for walkers is known. Brake rods provide the advantage of enabling the walker's height to be adjusted without affecting brake cables disposed within the walker's telescoping tubes. However, some walkers require the two separate steps of 1) adjusting and fixing the height of the telescoping tubes through thumb screws and 2) fixing the brake rod to function accordingly. This is time consuming, requiring additional parts and thus manufacturing costs. It also may require a significant degree of dexterity which may therefore be challenging and therefore frustrating for the user of the walker. Some walkers combine the fixing of the height of the telescoping tubes with the fixing of the brake rods. However such walkers require that the length of the telescoping tubes be first fixed by the user in order to enable the brake rods to function. Therefore, if the user does not have the dexterity to fix the height of the telescoping tubes, or if the fixing mechanism for the telescoping tubes malfunctions or no longer works through damage or wear and tear, such as a stripping of the thumb screw, this means that the brake rod cannot be fixed and the braking function of the walker will not work. This may result in a walker braking mechanism that is less robust and less safe.

BRIEF SUMMARY OF INVENTION

An object of the present invention is to provide an improved walker apparatus that overcomes the above disadvantages.

More particularly, the present invention provides a walker apparatus with a folding mechanism that allows the walker to be folded laterally in a compact manner, and that minimizes the number of required parts while optimizing robustness and lateral support. A frame shape is provided with enhanced strength-to-weight and strength-to-number-of-parts ratios, as well as enhanced stability for the walker apparatus. A collapsible basket is provided that simply collapses laterally in conjunction with the walker, that is readily removable and that requires fewer parts. A brake housing is provided that more fully encloses and therefore protects the brake pad mechanism, including the means for connecting and adjusting the brake pad, which thereby provides a more streamline, more robust and safer walker apparatus. A brake rod is provided that is self-adjusting and thereby provides a more robust, user-friendly and safe walker apparatus.

According to one aspect of the invention, there is provided a collapsible walker apparatus. The apparatus includes a pair of spaced-apart outer frame members, each having an upper end for placing one's hand and a lower end spaced-apart from the upper end. Ground-engaging wheels are rotatably mounted to the outer frame members at the lower ends. A pair of spaced-apart inner frame members are interposed between and pivotally connect to the outer frame members. Each of the inner frame members includes a first part and a second part hingedly connected together. One of the inner frame members has a seat handle outwardly extending therefrom. A pair of link members diagonally extend between and pivotally connect to the inner frame members for operatively connecting together the inner frame members. Each of the link members has a bend extending outwardly towards an adjacent one of the outer frame members. The link members have an extended mode for opening the inner frame members outward and thereby spacing-apart the outer frame members, and a folded mode actuated via the seat handle for bringing the inner frame members together and thereby bringing together the outer frame members to collapse the walker apparatus.

According to another aspect, there is provided a walker apparatus having a pair of upright, spaced-apart elongate members. Each of the elongate members has an upper end for placing one's hands and a lower end spaced-apart from the upper end. A first pair of ground-engaging wheels are rotatably mounted to the elongate members at the lower ends. The apparatus includes a pair of support members that are spaced-apart, arc-shaped and aligned respectively with and extend from the elongate members to distal ends of the support members. The support members have apexes extending towards the upper ends of the elongate members. A second pair of ground-engaging wheels operatively connect to the distal ends of the support members. A seat for resting connects to the apexes of the support members and the support members thereby support the seat.

According to yet another aspect, there is provided, in combination, a collapsible walker and a collapsible basket. The walker includes a pair of spaced-apart, operatively interconnected frame members. Each frame member has an upper end for placing one's hand and a lower end spaced-apart from the upper end. Ground-engaging wheels are rotatably mounted to the lower ends of the frame members. The walker includes means for bringing together the frame members for folding the walker. The collapsible basket includes a pair of spaced-apart end members. Each of the end members has a rigid peripheral portion and is connectable with a respective one of the frame members. The collapsible basket includes a basket member. The basket member is made of flexible fabric. The basket member extends between and is supported by the rigid peripheral portions of the end members. The end members are moveable towards each other, with the basket member thereby folding, to collapse the basket when folding the walker.

According to a further aspect, there is provided a walker apparatus that includes a pair of spaced-apart, operatively interconnected frame members each having an upper end and a lower end spaced-apart from the upper end. The apparatus has means for actuating a brake pad mechanism. Ground-engaging wheels are rotatably mounted to the lower ends of the frame members. The walker apparatus has a brake pad assembly which includes a brake housing connected to at least one of the frame members to partially cover at least one of the wheels. The brake pad assembly includes a brake pad mechanism. The brake pad mechanism includes a brake pad lever pivotally mounted to the brake housing. The brake pad lever has a first end operatively connecting to the means for actuating the brake pad mechanism, a second end opposite the first end, and a slot adjacent to the second end. A brake pad is slidably insertable within the slot and extends outwards therefrom towards the at least one of the wheels. The brake pad lever is spring-biased to position the brake pad spaced-apart from and adjacent to the at least one of the wheels. The brake pad mechanism includes a means for connecting the brake pad within the slot and for adjusting the position of the brake pad relative to the at least one of the wheels. The brake housing extends around the brake pad mechanism, including the means for connecting and adjusting, to at least the outer periphery of the at least one of the wheels for fully protecting the brake pad mechanism thereby, whereby upon actuation of the means for actuating the brake pad mechanism, the brake pad lever causes the brake pad to engage the at least one of the wheels for inhibiting rotation of the at least one of wheels.

According to yet a further aspect, there is provided a walker apparatus having a pair of spaced-apart, operatively interconnected frame members. Each of the frame members has an upper end and a lower end spaced-apart from the upper end. The frame members each include telescoping tubes having an adjustment range for adjusting the height of the upper end and a means for locking the telescoping tubes together. Ground-engaging wheels are rotatably mounted to the frame members at the lower ends. The walker apparatus includes a handle bar assembly at the upper ends of the frame members. The handle bar assembly includes a gripping handle for squeezing with one's hand, a connection member operatively connected to the gripping handle, and an actuation means for actuating the connection member when the gripping handle is squeezed. The walker apparatus includes a brake pad means for braking at least one of the wheels. The brake pad means is operatively connected to the lower end of the frame members. The walker apparatus includes a self-adjusting brake rod assembly disposed within at least one of the frame members. The brake rod assembly includes a brake rod operatively connected to the brake pad means and a gripping member operatively connected to the connection member. The gripping member remains adjacent to the brake rod throughout the adjustment range of the telescoping tubes. The gripping member is spring-biased to remain free of the brake rod in a non-actuated mode and, when the gripping handle of the walker is squeezed, to actuate the connection member. The gripping member is thereby actuated to engage and thereby actuate the brake rod. The brake pad means brakes at least one of the wheels upon actuation of the brake rod.

According to an even further aspect, there is provided a collapsible walker apparatus having a pair of spaced-apart outer frame members including a pair of upright, spaced-apart telescoping tubes. Each of the telescoping tubes has an upper end, an adjustment range for adjusting the height of the upper end, a lower end spaced-apart from the upper end, and a means for releasably locking the telescoping tubes together. The outer frame members include a pair of support members that are spaced-apart, arc-shaped, and aligned respectively with and extend from the telescoping tubes to distal ends of the support members. The support members have apexes extending towards the upper ends of the telescoping tubes. A first pair of ground-engaging wheels each connect at the lower end to one of the telescoping tubes. A second pair of ground-engaging wheels operatively connect to the distal ends of the support members. The walker apparatus includes a handle bar assembly at the upper ends of the telescoping tubes. The handle bar assembly includes a gripping handle for squeezing with one's hand, a connection member operatively connected to the gripping handle, and an actuation means for actuating the connection member when the gripping handle is squeezed. The walker apparatus includes a self-adjusting brake rod assembly disposed within at least one of the frame members. The brake rod assembly includes a brake rod and a gripping member operatively connected to the connection member. The gripping member remains adjacent to the brake rod throughout the adjustment range of the telescoping tubes. The gripping member is spring-biased to remain free of the brake rod in a non-actuated mode and, when the gripping handle of the walker is squeezed, to actuate the connection member. The gripping member is thereby actuated in an actuated mode to engage and thereby actuate the brake rod. The walker apparatus includes a brake pad assembly having a brake housing connected to at least one of the telescoping tubes to partially cover at least one of the wheels. The brake pad assembly includes a brake pad mechanism. The brake pad mechanism includes a brake pad lever pivotally mounted to the brake housing. The brake pad lever has a first end operatively connecting to the brake rod, a second end opposite the first end, and a slot adjacent to the second end. A brake pad is slidably insertable within the slot and extends outwards therefrom towards the at least one of the wheels. The brake pad lever is spring-biased to position the brake pad spaced-apart from and adjacent to the at least one wheel. The brake pad mechanism includes means for connecting the brake pad within the slot and for adjusting the position of the brake pad relative to the at least one of the wheels. The brake housing extends about the brake pad mechanism, including the means for connecting and adjusting, to at least the outer periphery of the at least one of the wheels. The brake housing thereby fully protects the brake pad mechanism, whereby in the actuated mode, the brake rod is actuated and thereby engages the brake pad lever which causes the brake pad to engage the at least one of the wheels for inhibiting rotation of the at least one of wheels. The walker apparatus includes a pair of spaced-apart inner frame members interposed between and pivotally connecting to the outer frame members. One of the inner frame members connects to the apexes of the support members and forms a seat. Each of the inner frame members includes a first part and a second part hingedly connected together. One of the inner frame members has a seat handle. A pair of link members diagonally extend between and pivotally connect to the inner frame members for operatively connecting together the inner frame members. Each of the link members has a bend extending outwardly towards an adjacent one of the outer frame members. Each of the link members has an extended mode for opening outward the inner frame members and thereby spacing-apart the outer frame members and a folded mode actuated via the seat handle for bringing together the inner frame members and thereby bringing together the outer frame members to collapse the walker apparatus. The walker apparatus includes a collapsible basket having a pair of spaced-apart end members. The end members each include a rigid peripheral portion and are connectable with a respective one of the outer frame members. The collapsible basket includes a basket member made of flexible fabric. The basket member extends between and is supported by the rigid peripheral portions of the end members. The end members are moveable towards each other with the basket member folding thereby to collapse the basket when folding the walker.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
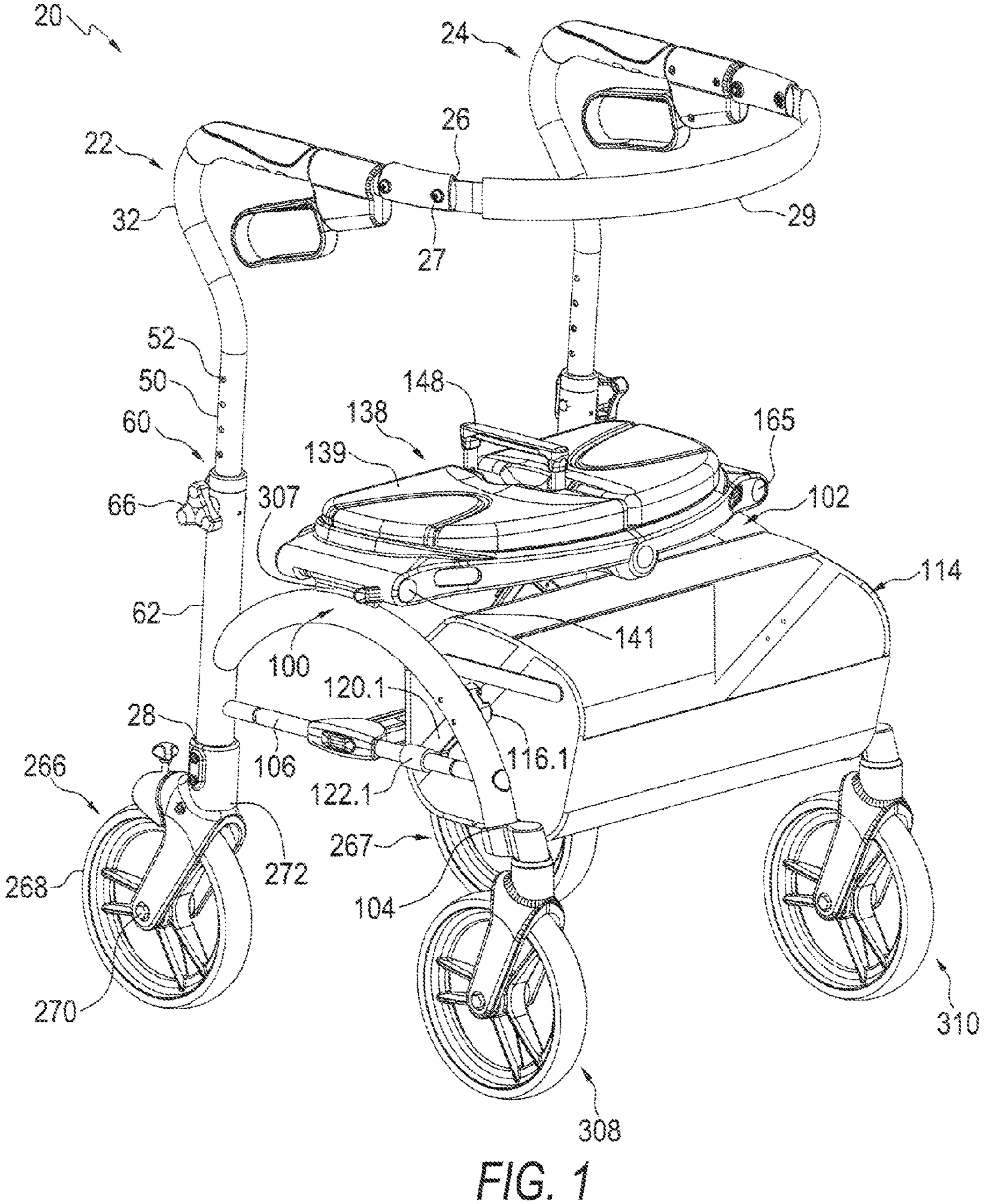
FIG. 1 is a top, front isometric view of a walker apparatus, according to one embodiment of the invention.
Figure 2:
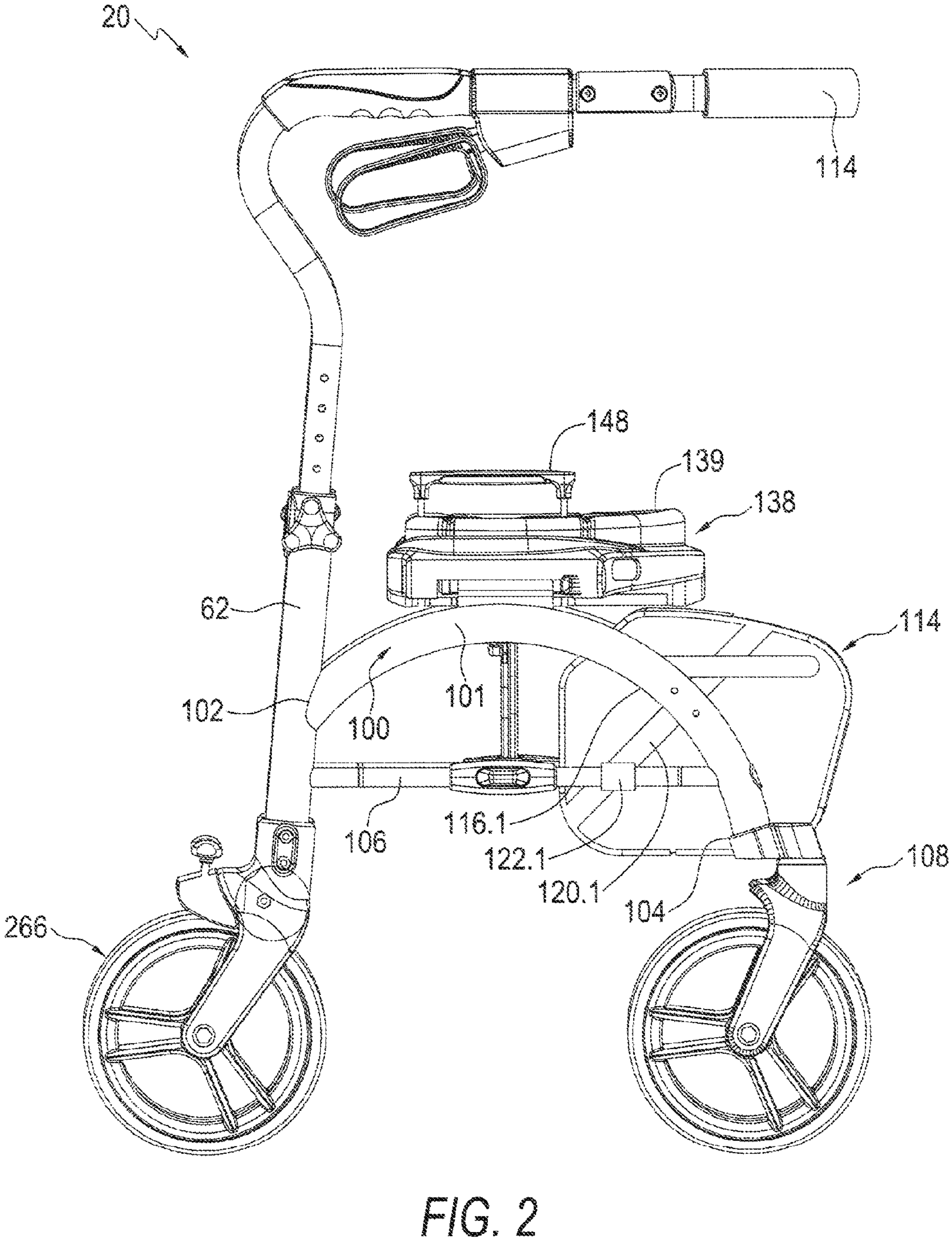
FIG. 2 is a side elevation view of the walker apparatus of FIG. 1.

Referring to the drawings and first to FIGS. 1 to 4, there is provided a walker apparatus in this example a foldable walker apparatus 20. The walker apparatus 20 includes a pair of upright, spaced-apart elongate members or outer frame members 22 and 24. As shown in FIG. 1, outer frame member 22 has an upper end 26 and a lower end 28 spaced-apart therefrom. A screw 27 located adjacent to the upper end connects to a backrest member 29. The same applies for outer frame member 24 and the backrest member 29 thereby connects the outer frame members 22 and 24 together at their upper ends.

Each of the outer frame members has substantially the same parts and performs substantially the same functions and therefore only outer frame member 22 will be discussed in detail.

Figure 5:
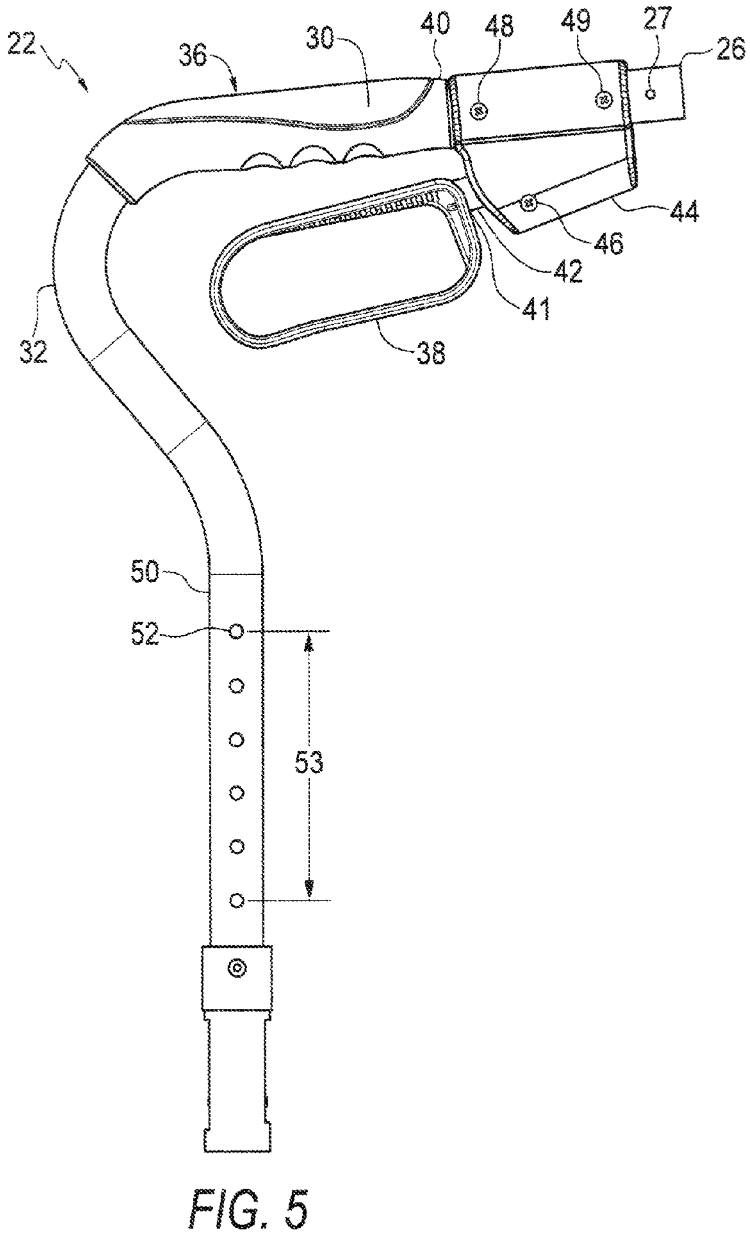
FIG. 5 is a side elevation view of part of an outer frame member including a handle bar assembly, according to one embodiment of the invention.

FIG. 5 shows part of the outer frame member 22 including a straight portion 40 with a handle bar assembly 36 extending outwards therefrom adjacent the upper end 26. The handle bar assembly 36 includes a grip pad 30 extending along the straight portion 40. The handle bar assembly 36 includes a handle bar housing 44 comprised of two halves secured together and secured to the straight portion 40 via screws 46, 48 and 49. The handle bar assembly 36 also includes a first handle lever 42 having a first end 41 with an actuator, in this example a braking or gripping handle 38, extending therefrom. The handle bar assembly 36 is illustrated in greater detail in FIGS. 7 to 9 where one half of the handle bar housing 44 is partially removed to show an interior 45 of the handle bar housing 44.

Figure 7:
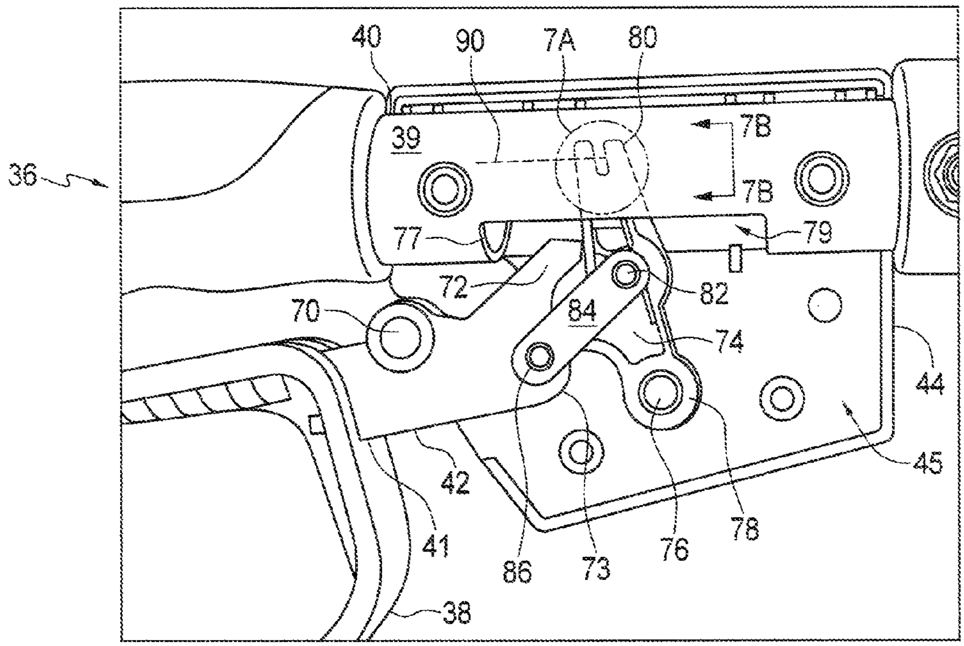
FIG. 7 is a partial, side elevation view of the interior of the handle bar assembly including a handle in a non-actuated mode.

Referring first to FIG. 7, this shows the handle bar assembly in an non-actuation mode. The first handle lever 42 is pivotally mounted via pivot 70 to the handle bar housing 44. The first handle lever 42 has a second end 72 spaced-apart from the first end 41. The first handle lever 42 includes a projection 73 interposed between the first end 41 and the second end 72. The second end 72 is positioned to be engageable a second handle lever 74.

The second handle lever 74 is pivotally mounted to the handle bar housing 44 via pivot 76 at a first end 78 of the second handle lever 74. The second handle lever 74 has a second end 80 spaced-apart from the first end 78. A link 84 pivotally connects together the first handle lever 42 to the second handle lever 74 via pivot 86 which is between ends 41 and 72 of the first handle lever, and pivot 82 which is between ends 78 and 80 of the second handle lever. The first handle lever 42, the second brake lever 74 and the link 84 so configured and connected to the housing may collectively be referred to as an actuation means for actuating a connection member or brake wire 90 when the gripping handle 38 is squeezed. As shown in FIG. 7C, the second handle lever 74 has a projection 75 between the first end 78 and the second end 80 that extends towards the projection 73 of the first handle lever 42. These are shown in FIG. 7C with the link 84 removed. Referring FIG. 7, the second end 80 of the second handle lever 74 extends within and is moveable within a recess 79 of a body 39 of the straight portion 40 of the outer frame member. An edge 77 is interposed between the body 39 and recess 79.

Figure 7A:
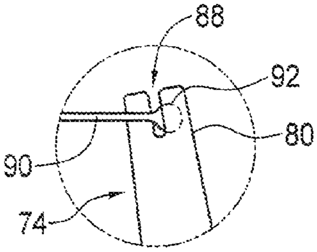
FIG. 7A is an enlarged up, side elevation view of a lever and brake wire connected thereto for the handle bar assembly of FIG. 7.
Figure 7B:
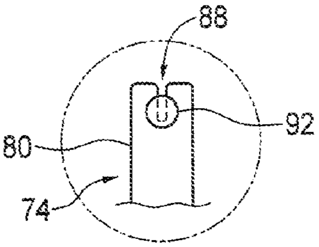
FIG. 7B is an enlarged view along lines 7B-7B of FIG. 7 illustrating the lever and brake wire connected thereto.
Figure 7C:
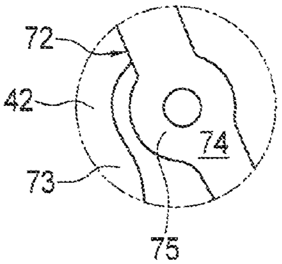
FIG. 7C is an enlarged, partial view of FIG. 7 showing a projection from a first handle lever and an adjacent projection from a second handle lever.

Referring to FIGS. 7A and 7B which show partially within the recess 79, the second end 80 includes a slot 88. The brake wire 90 is connected to the second handle lever 74 through a nipple 92 extending from the brake wire 90 and that slidably engages with the slot 88.

Figure 8:
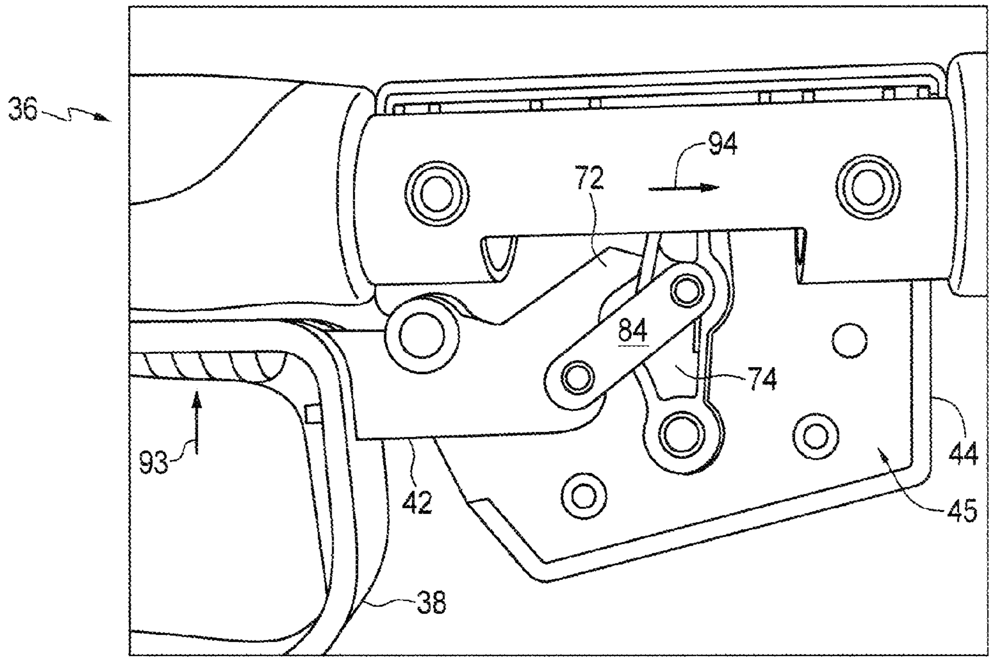
FIG. 8 is a partial, side elevation view similar to FIG. 7 with the handle is an actuated brake mode.

The handle bar assembly 36 may be positioned in an actuated, braking mode as shown in FIG. 8. When the gripping handle 38 is actuated or pulled upwards from the perspective of FIG. 8 as indicated by arrow 93, this causes the second end 72 of the first handle lever 42 to forceably abut against and push the second handle lever 74 to the right, from the perspective of FIG. 8 as indicated by arrow 94. This thereby causes the brake wire 90 to be actuated.

Figure 9:
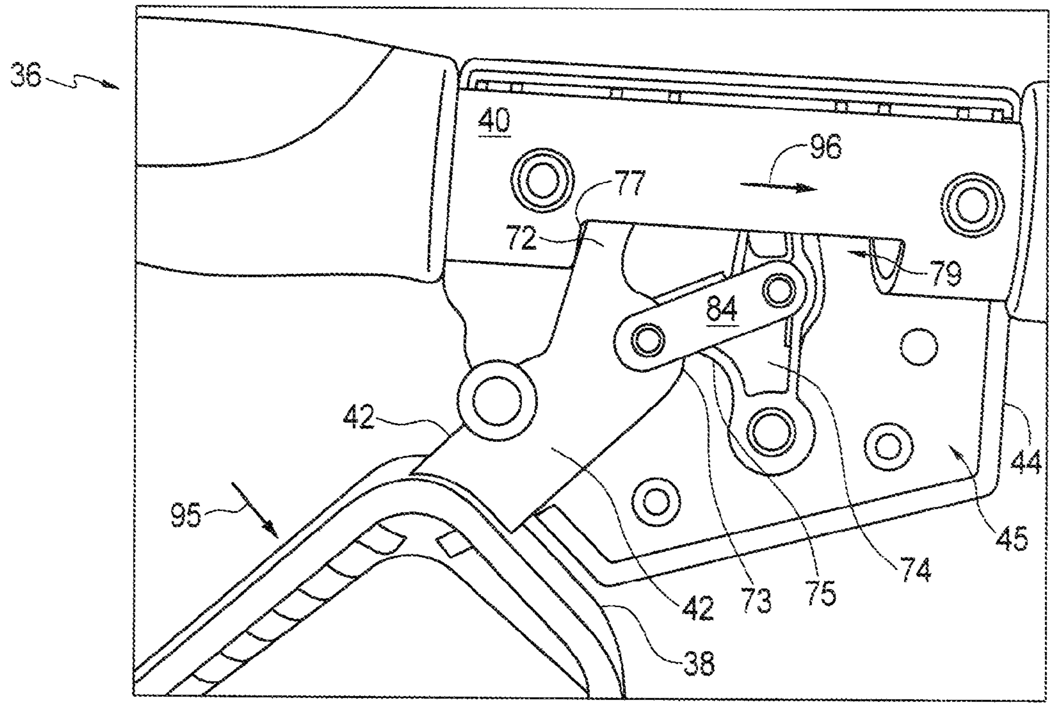
FIG. 9 is a partial, side elevation view similar to FIG. 7 with the handle is an actuated park mode.

The handle bar assembly 36 may be positioned in an actuated, parking mode as shown in FIG. 9. When the gripping handle is actuated or pushed downward from the perspective of FIG. 9, this causes the first end 72 of the first handle lever 42 to move within the recess 79 and abut against edge 77. Also, the projection 73 of the first handle lever 42 is caused to forcibly abut with the projection 75 of the second handle lever 74. The first handle lever 42 is thereby held in place by being wedged between the edge 77 of the straight portion 40 and the projection 75. The abutment of the projection 73 against projection 75 thereby causes the second handle lever 74 to move to the right from the perspective of FIG. 9 as indicated by arrow 96 and thereby actuate the brake wire 90.

Figure 6:
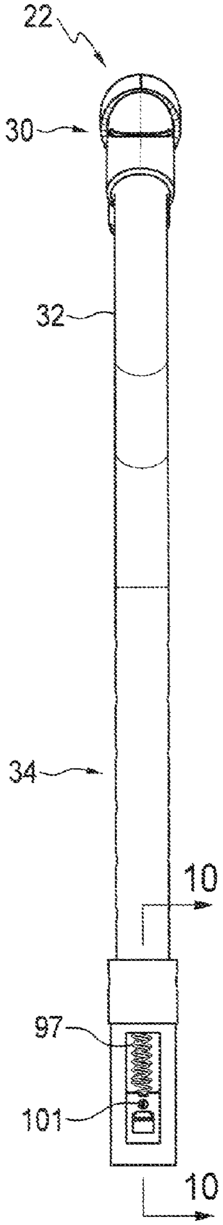
FIG. 6 is a rear elevation view of the part of the outer frame member of FIG. 5.

Referring back to FIGS. 5 and 6, the frame member 22 has a bend 32 extending from the straight portion 40. Referring to both FIG. 1 and FIG. 5, the bend 32 extends to telescoping tubes 60 which include inner tube 50 and outer tube 62 shaped to receive the inner tube 50. The straight portion 40, the bend 32 and telescoping tubes 60 together provide a rounded L-shape for the outer frame member 22. Tube 50 has a plurality of spaced-apart apertures 52 which define an adjustment range 53, as shown in FIG. 5. A means for locking the telescoping tubes together, in this example a thumb screw 66, shown in FIG. 1, may be inserted through one of said apertures to fixedly adjust the height of the telescoping tubes 60, as is well known to those skilled in the art. This thereby enables the height of the walker apparatus to be adjusted to provide an optimized height for the user.

Figure 10:
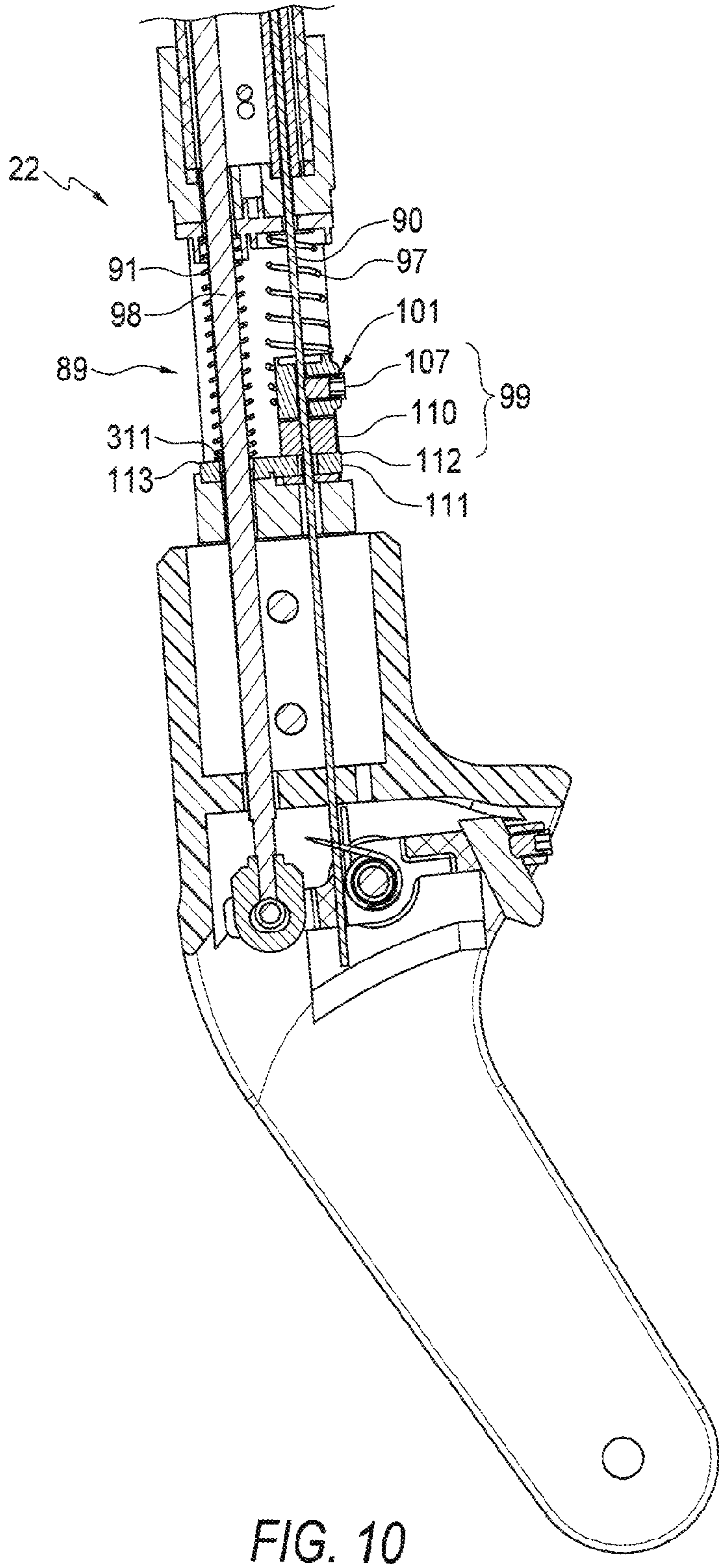
FIG. 10 is a side partial view of the outer frame member in section along lines 10-10 of FIG. 6 to illustrate a brake rod assembly according to one embodiment of the invention.

FIG. 10 shows part of the outer frame member 22 partially in section to reveal a brake rod assembly 89. The brake rod assembly 89 includes a brake rod 98 which extends within inner tube 50 of FIG. 5. The brake rod 98 in this example has a hexagonal cross-section. A coil spring 91 extends about the brake rod 98. A gripping member 99 is adjacent to and is slidably engageable with the brake rod 98 along a distance equal to the adjustment range 53 of FIG. 5. The gripping member 99 in this example includes a clamp 101 that engages with the brake wire 90 via a set screw 107. A coil spring 97 wraps around brake wire 90 above the clamp 101 from the perspective of FIG. 10. The coil spring 91 and the coil spring 97 bias the gripping member 99 downwards, from the perspective of FIG. 10, towards a non-actuated mode. The gripping member 99 also includes a block 110 and plate 112, in this example a metal plate, that both also engage with the brake wire 90 near a first end 111 of the metal plate, which is also an end of the gripping member. As seen in FIG. 10, coil spring 97 biases the plate near the first end of the plate. The metal plate 112 has an aperture 311 near a second end 113 of the metal plate, which is also an end of the gripping member, spaced-apart from the first end 111. The brake rod 98 passes through the aperture 311. The metal plate 112 is slidably engageable with the brake rod 98. As seen in FIG. 10, coil spring 91 biases the plate near the second end 113 of the plate.

Figure 11:
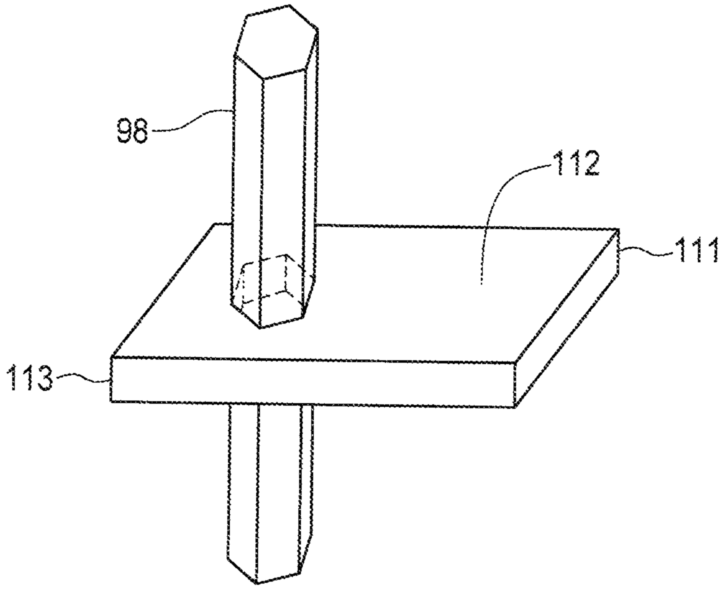
FIG. 11 is an enlarged, partial elevation view of the brake rod with a gripping member according to one embodiment of the invention slidably connected thereto in a non-actuated mode.
Figure 12:
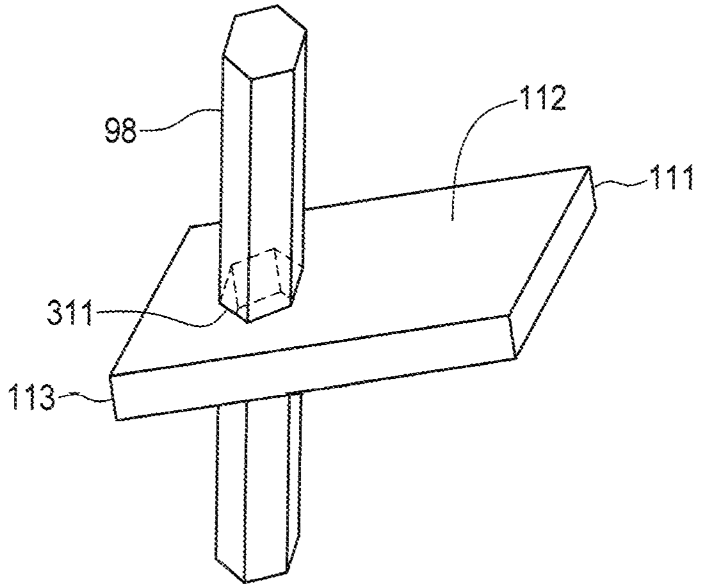
FIG. 12 is an enlarged, partial elevation view similar to FIG. 11 with the gripping member engaging the brake rod in an actuated mode.

FIG. 11 shows the metal plate 112 and the brake rod 98 of FIG. 10 in isolation. The metal plate 112 slidably receives the brake rod 98 in a non-actuated mode. The brake wire 90 is operatively connected adjacent to the first end 111 as seen in FIG. 10. When the brake wire 90 is actuated or pulled upwards from the perspective of FIGS. 10 and 11, the first end 111 of the metal plate moves upward as indicated by FIG. 12. The plate is thereby caused to tilt, with the aperture 311 abutting and engaging the brake rod 98. The metal plate 112 thereby is able to grip the brake rod 98. The brake wire 90 continues to be pulled upwards when actuated and this causes the metal plate, and in turn, the brake rod 98, to move upwards in unison with the brake wire 90.

Referring back to FIG. 1, a first pair of wheel assemblies 266 and 267 are rotatably mounted to the outer frame members 22 and 24. In this example both wheel assembly 266 and wheel assembly 267 are structurally and functionally the same. Accordingly, only wheel assembly 266 will be discussed in detail.

Figure 13:
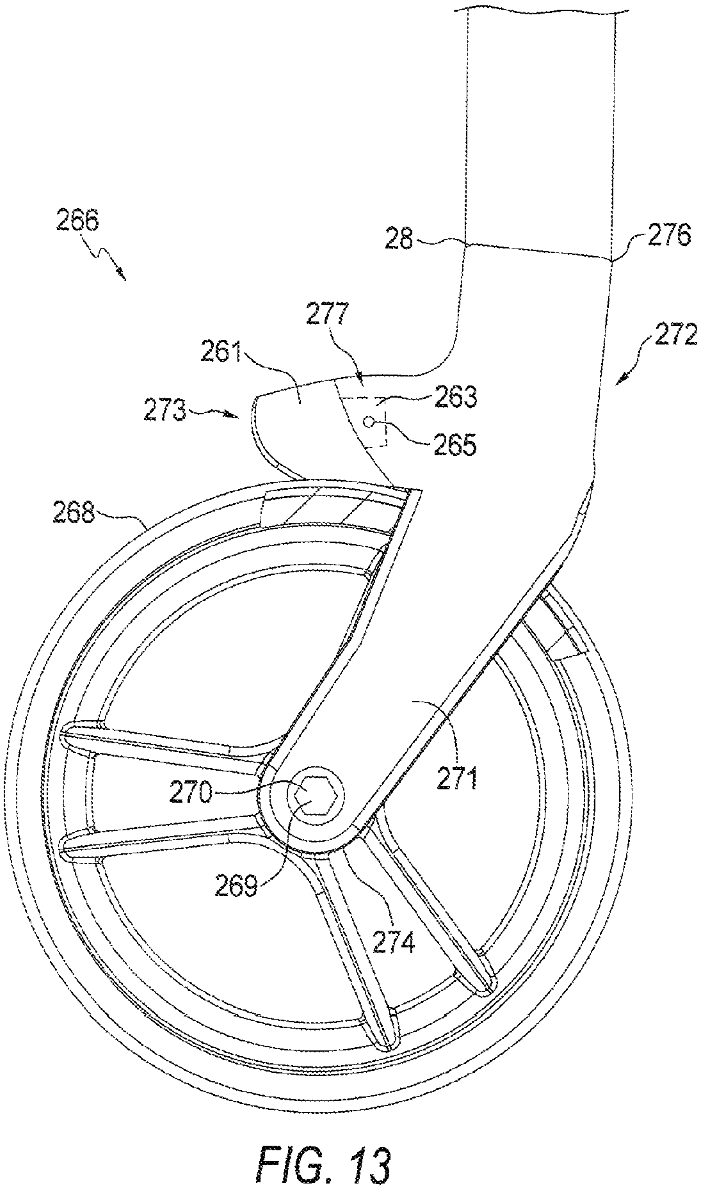
FIG. 13 is a side elevation view of a wheel assembly illustrating a brake housing according to one embodiment of the invention.
Figure 14:
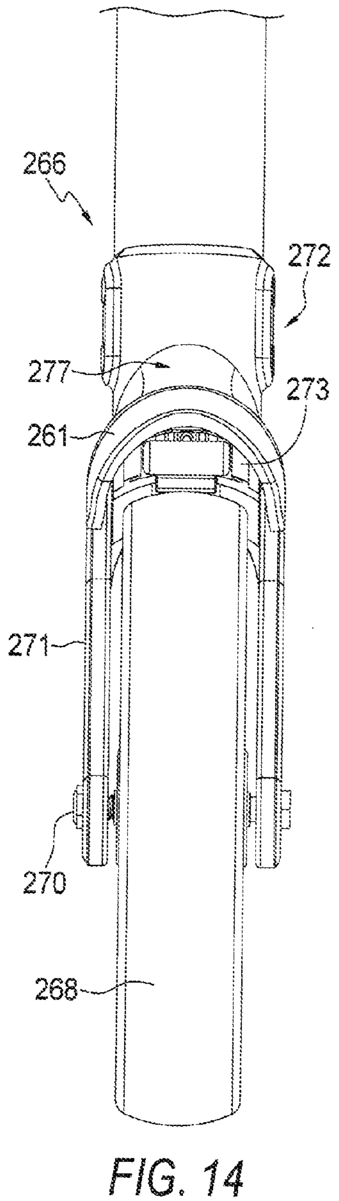
FIG. 14 is a rear elevation view of the wheel assembly and brake housing.

Referring to FIGS. 13 and 14, the wheel assembly 266 includes a brake pad assembly 272. The brake pad assembly 272 has a proximal end 276 that connects to the lower end 28 of the outer frame member 22. The brake pad assembly 272 has a bracket housing 271 that receives a ground-engaging wheel 268 at a distal end 274 of the brake pad assembly which is spaced-apart from the proximal end 276. An aperture 270 near the distal end 274 connects to the wheel 268 via a wheel axis 269. The brake pad assembly 272 includes a brake housing 277 between the proximal end 276 and the distal end 274. The brake housing 277 extends overtop of and along at least a portion of the wheel 268 and includes an interior 273. The brake housing 277 includes a removable covering portion 261 that has an inner portion 263 within the interior 273 and which connects to the rest of the brake housing by means of a screw 265 which his Allen key removable in this example.

Figure 15:
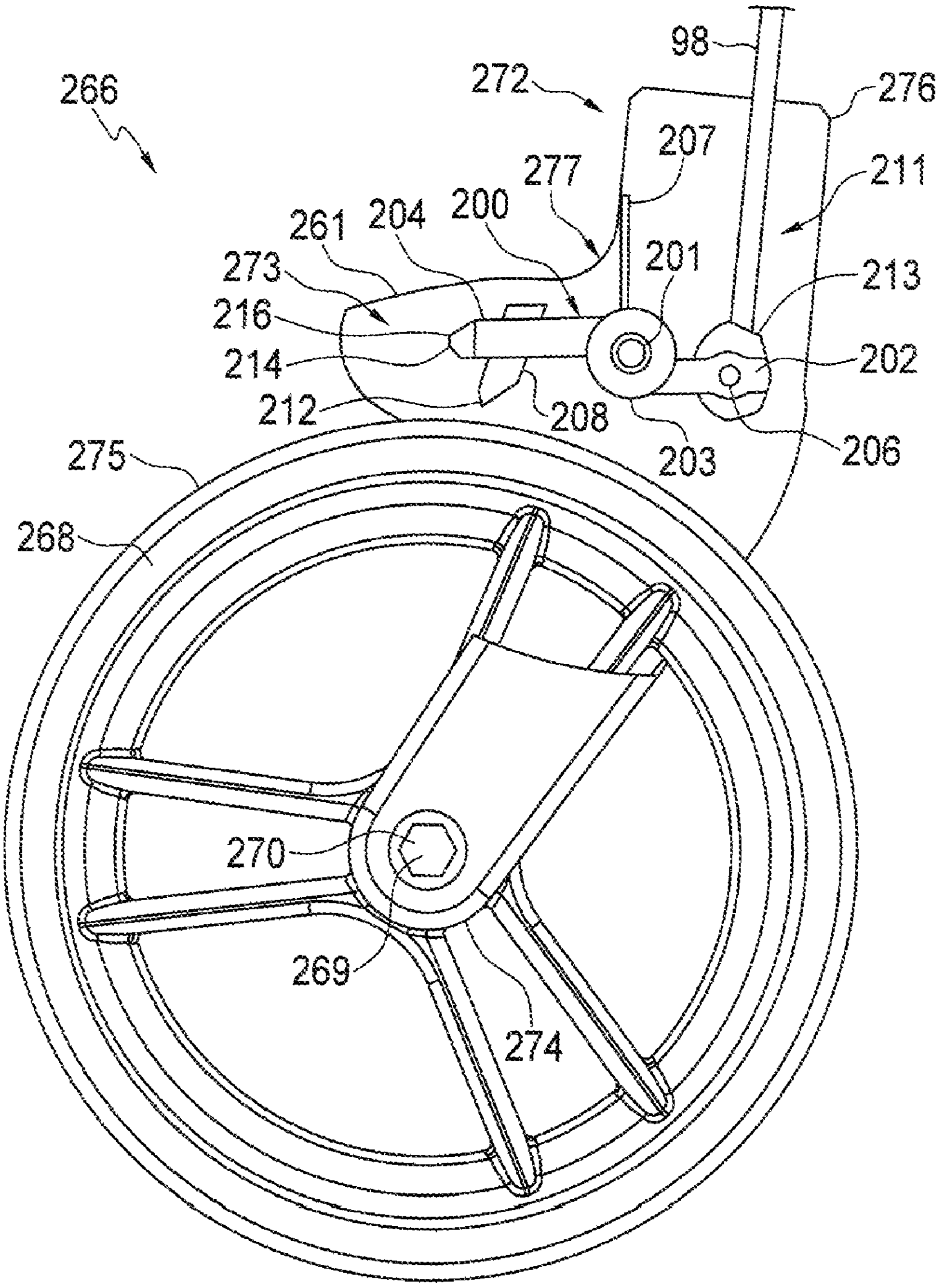
FIG. 15 is a side elevation view similar to FIG. 13 with the brake housing partially in section to illustrate a brake pad assembly in a non-actuated mode.
Figure 16:
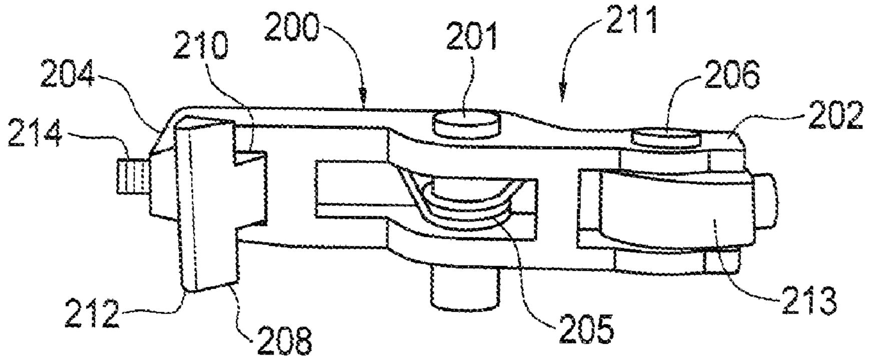
FIG. 16 is bottom plan view of the brake pad assembly of FIG. 15.
Figure 17:
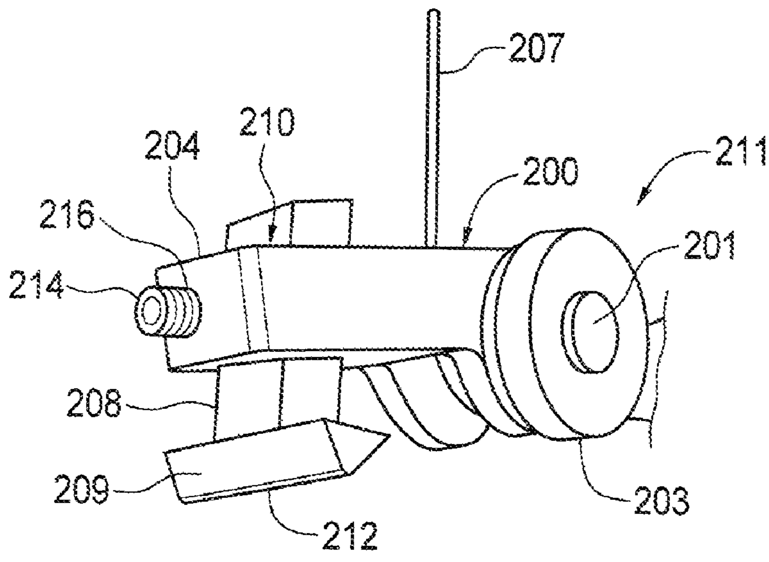
FIG. 17 is a rear perspective view of the brake pad assembly of FIG. 16 illustrating a brake pad and a means for fixing and adjusting the brake pad.

FIG. 15 shows the wheel assembly 266 with the brake housing 277 partially removed to show the interior 273. The brake pad assembly 272 includes a brake pad mechanism 211 located within the interior 273. The brake pad mechanism 211 includes a brake pad lever 200 pivotally mounted to the brake housing 277 via pivot rod 201 as best shown in FIG. 16. Bushings 203 on both ends of the pivot rod 201 are interposed between the brake pad lever 200 and the brake housing 277. A spring 205 is coiled around the pivot rod 201 and, as shown in FIG. 17, includes an outer portion 207 that extends outwardly away from the brake pad lever 200. The brake pad lever 200 has a first end 202 with a pivot 213 that connects to the brake rod 98. The brake pad lever 200 also has a second end 204 which is opposite the first end 202.

Figure 18:
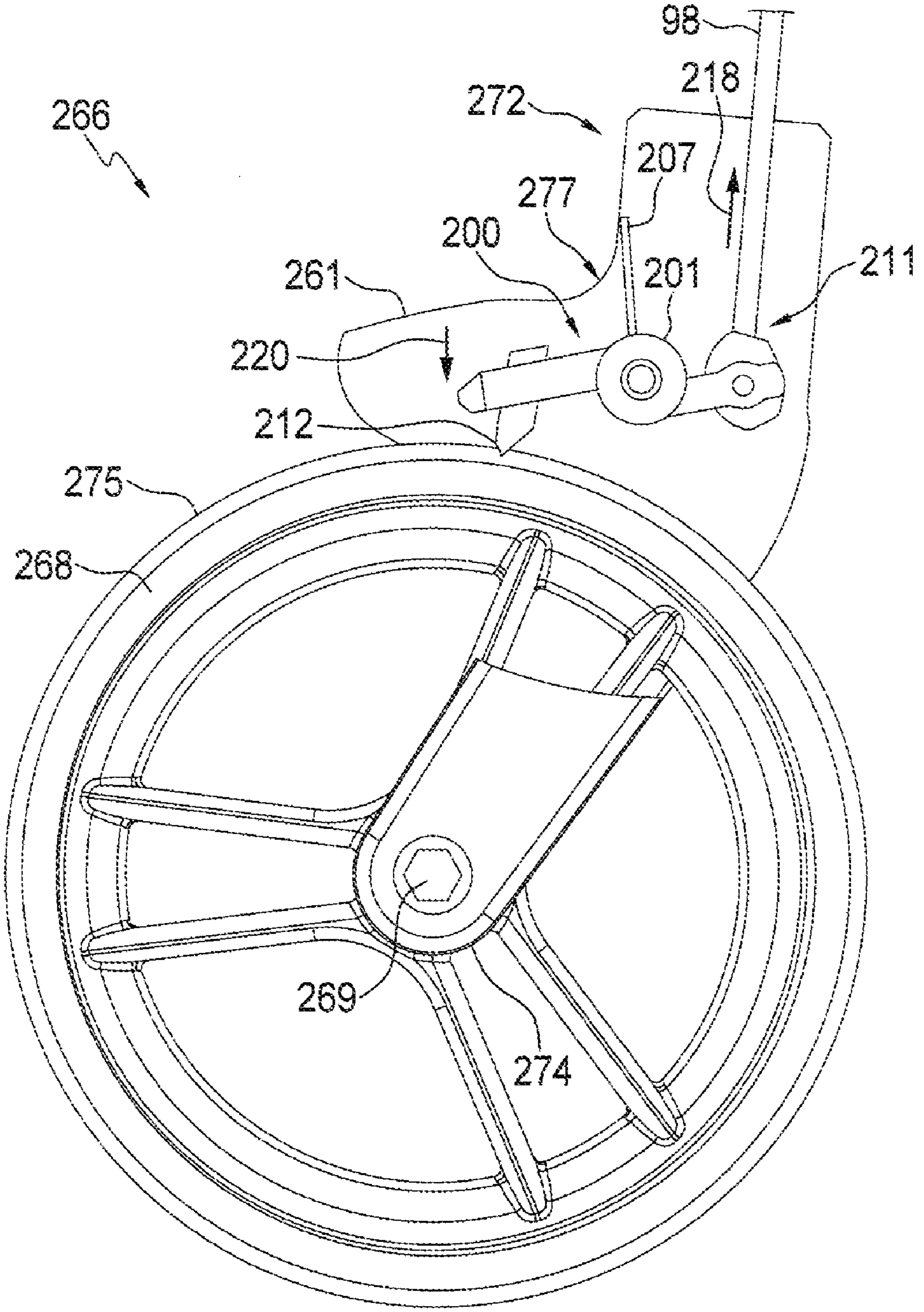
FIG. 18 is a side elevation view similar to FIG. 15 illustrating the brake pad assembly in an actuated mode with the brake pad engaging the wheel.
Figure 19:
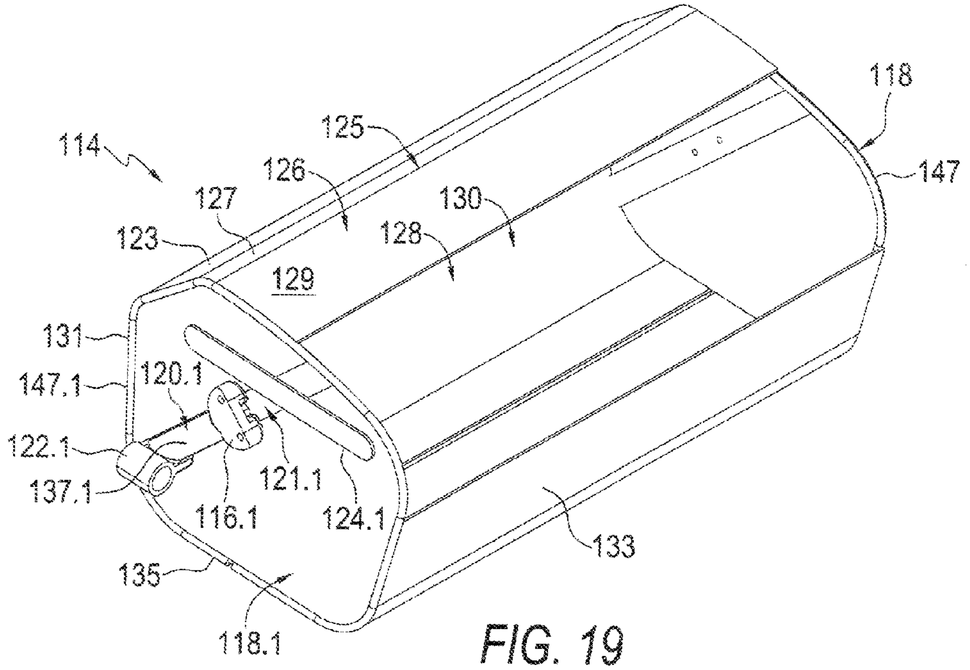
FIG. 19 is a top, front isometric view of a collapsible basket according to one embodiment of the invention.
Figure 20:
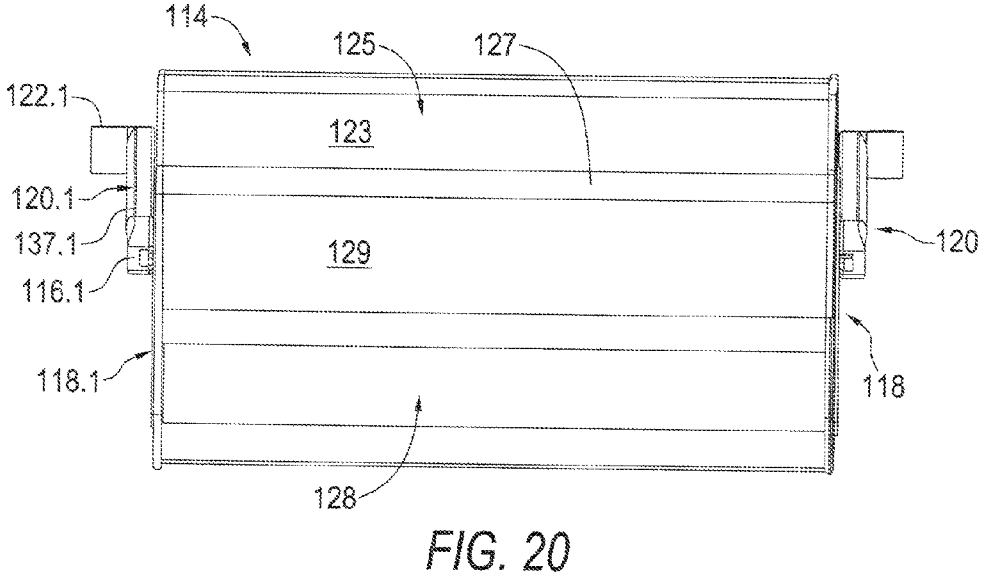
FIG. 20 is a top plan view of the collapsible basket of FIG. 19.

A brake pad 212 is located near the second end 204. As best shown in FIG. 17, it includes an elongate part 208 that is slidably insertable within a slot 210. The brake pad 212 extends outwards from the slot 210 towards an outer periphery 275 of the wheel 268 shown in FIG. 18. The brake pad 212 includes a contact part 209 extending parallel to the wheel axis 269 shown in FIG. 15 for engaging the wheel 268. The brake pad 212 as a result is T-shaped in this example.

The brake pad mechanism 211 includes a means 214 for connecting the brake pad 212 within the slot 210 and for adjusting the position of the brake pad 212 relative to the wheel 268. The means 214 for connecting and adjusting is located at the second end 204 of the brake pad lever 200, as best shown in FIG. 17. In this example, the means for connecting and adjusting 214 is an Allen key adjustable screw that passes through aperture 216 to releasably abut the elongate part 208 of the brake pad 212. Referring to FIG. 15, the covering portion 261 is adjacent to the means 214 for connecting and adjusting. The brake housing 277 extends around the brake pad mechanism 211, including the means 214 for connecting and adjusting, to at least the outer periphery 275 of the wheel 268 for fully protecting the brake pad mechanism 211 thereby. Advantageously, the means 214 for connecting and adjusting is accessible upon removal of the covering portion 261.

The brake pad lever 200 is spring-biased via the outer portion 207 of the spring 205, which abuts against the brake housing 277 as shown in FIG. 15, to position the brake pad 212 spaced-apart from and adjacent to the outer periphery 275 of the wheel 268.

In operation, to brake the walker apparatus, the braking handle is either pulled upwards in the direction of arrow 93 for braking as shown FIG. 8 or pushed downwards for parking as shown in FIG. 9. Either of these actions operatively actuates the brake wire 90, which in turn actuates the gripping member 99 to engage or actuate the brake rod 98, as shown in FIG. 12. When brake rod 98 is actuated or moved upward from the perspective of FIG. 18, the brake pad lever 200 causes the brake pad 212 to engage the wheel 268 for inhibiting rotation of the wheel.

Referring back to FIG. 1, the walker apparatus 20 has a second pair of ground-engaging wheel assemblies 308 and 310. These wheel assemblies 308 and 310 are similar to wheel assemblies 266 and 267 with the exception that they do not include brake pad assemblies or mechanisms.

Figure 3:
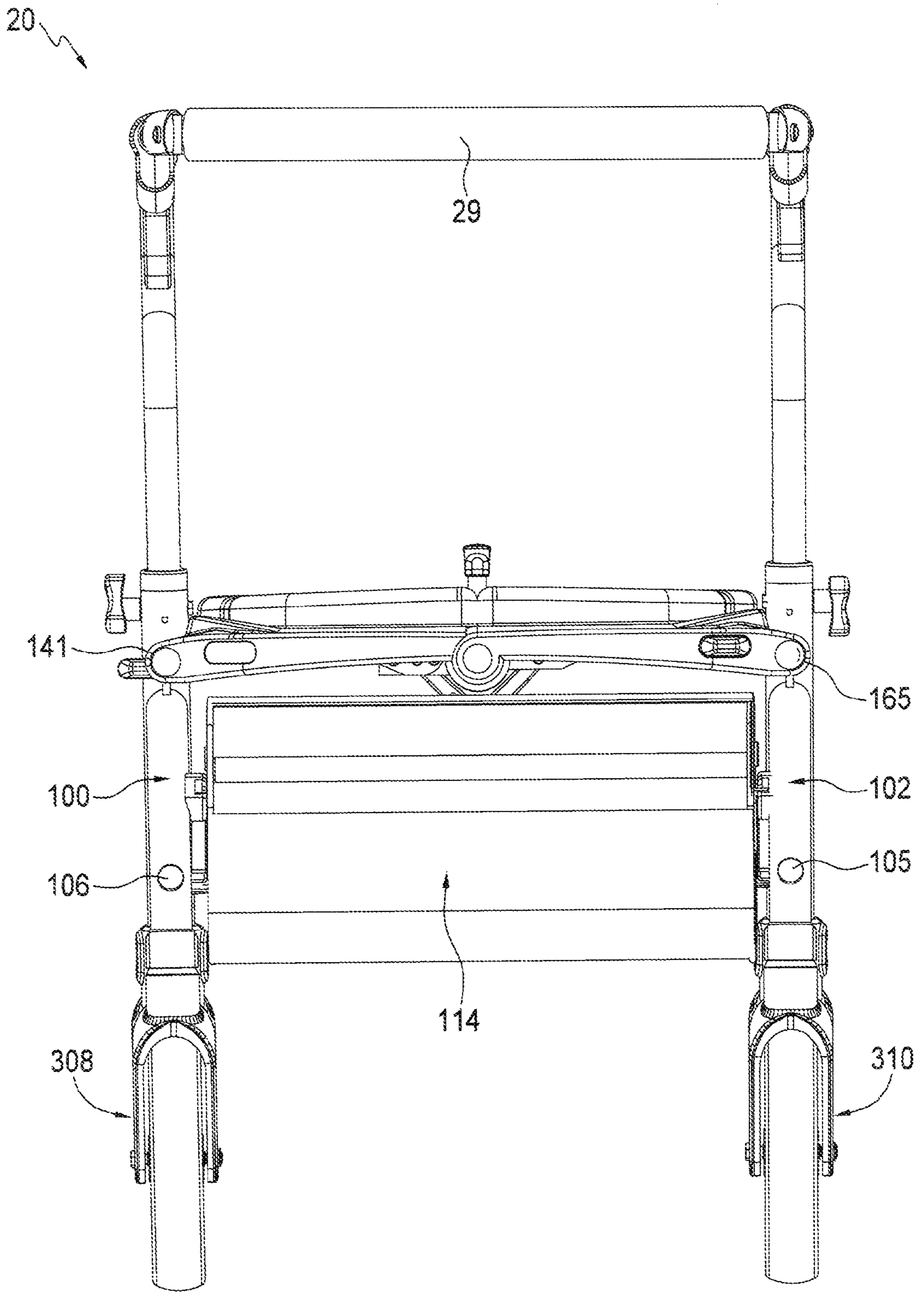
FIG. 3 is a front elevation view of the walker apparatus of FIG. 1.
Figure 4:
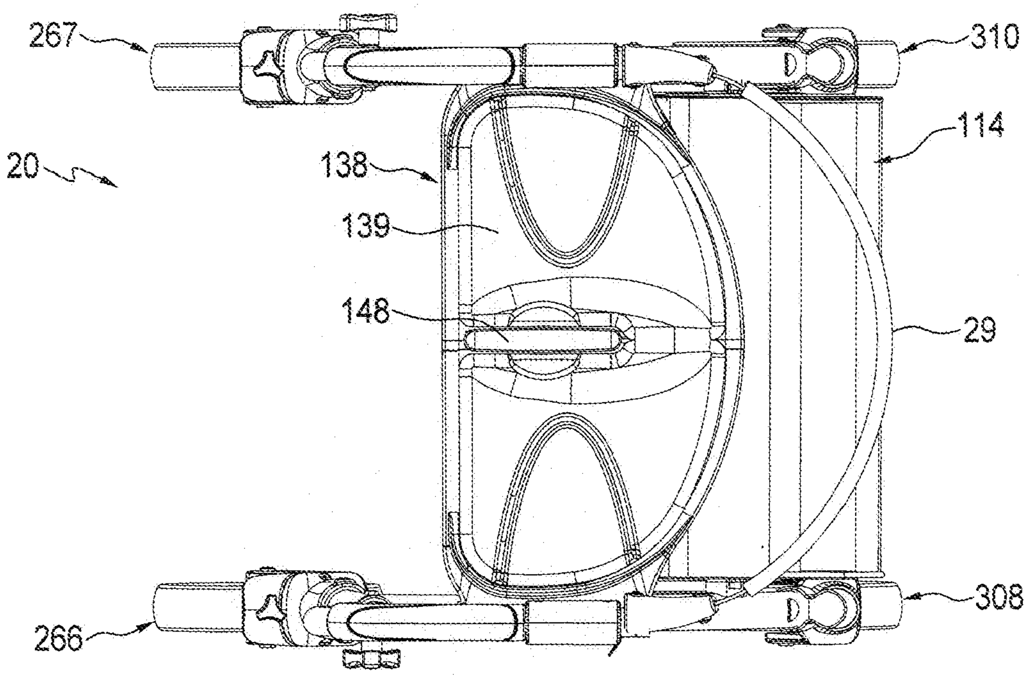
FIG. 4 is a top plan view of the walker apparatus of FIG. 1.

A pair of spaced-apart support members 100 and 102 connect together the first and second pair of wheel assemblies, as best shown in FIGS. 1 and 3. Each support member is the substantially the same and has the same structure and function. Only support member 100 will be discussed in detail. Support member 100 aligns with and extends from the tube 62 of the outer frame member 22 to a distal end 104 of the support member which connects to wheel assembly 308. The support member 100 is arc-shaped and partially circular. The support member 100 has an apex 307. The apex 307 is the most elevated point of the support member 100 from the perspective of FIG. 1. The apex extends towards the upper end 26 of the elongate member 22. A seat 139 for resting, which includes an extendable and retractable seat handle 148, connects to the apexes of the support members. The support members thereby support the seat 139. A rod 106 extends from the tube 62 of the outer frame member 22 to near the distal end 104 of the support member 100. The same applies with respect to rod 105 for corresponding support member 102 as partially shown for example in FIG. 3.

The foldable walker apparatus includes a collapsible basket 114 that extends between the support members 100 and 102. The collapsible basket 114 is best shown in FIGS. 19 to 22. The collapsible basket 114 includes a basket member 125 made in this example of flexible fabric. The term fabric is used in the broadest sense of the word, and may include non-woven material, plastic, flexible sheets and other such materials. The basket member 125 in this example has a top 126 with abutting faces 123, 127 and 129. The top 126 has an opening 128 for inserting objects into an interior 130 of the basket member. The basket member 125 includes sides 131 and 133 that extend downwards from the top 126 from the perspective of FIG. 19. The sides 131 and 133 in this example are made of netting. A bottom 135 opposite the top 126 connects the sides 131 and 133. The bottom 135 in this example is made of continuous, non-netted fabric.

The collapsible basket 114 includes spaced-apart end members 118 and 118.1. Each end member, such as end member 118, is flat and includes a rigid peripheral portion which in this example is a wire loop in this example 5-sided wire frame 147. The basket member 125 extends between and is supported by the wire frame of the end members. The end members are moveable towards each other when the walker apparatus is folded due to the flexibility of the basket member 125. The basket member may thereby fold to collapse the collapsible basket 114 when folding the walker apparatus. Importantly, this is possible without needing to remove the collapsible basket 114 from the walker apparatus.

Figure 21:
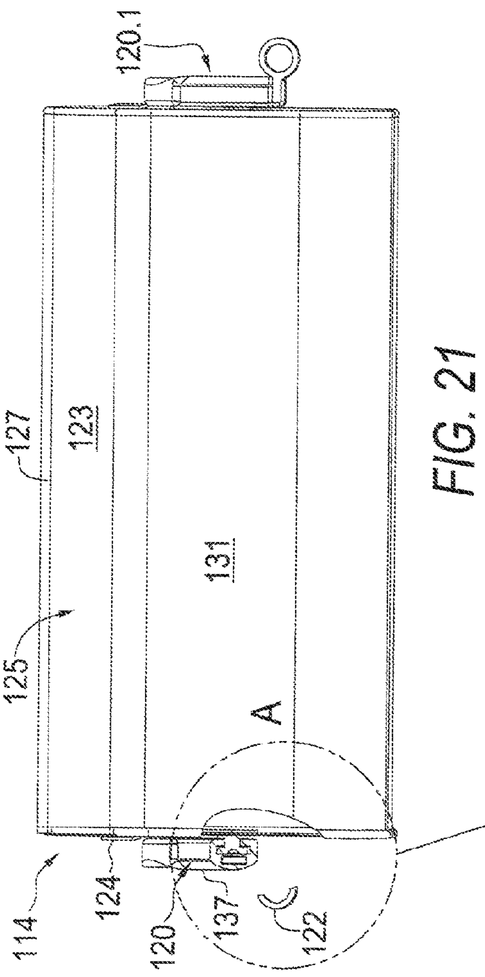
FIG. 21 is a rear elevation view of the collapsible basket of FIG. 19.
Figure 21A:
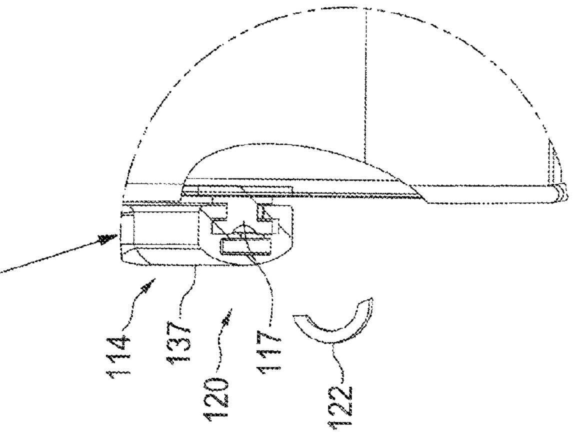
FIG. 21A is an enlarged view of FIG. 21 illustrating a connection bracket and an insert shaped to be received by the connection bracket for thereby mounting the collapsible basket.
Figure 22:
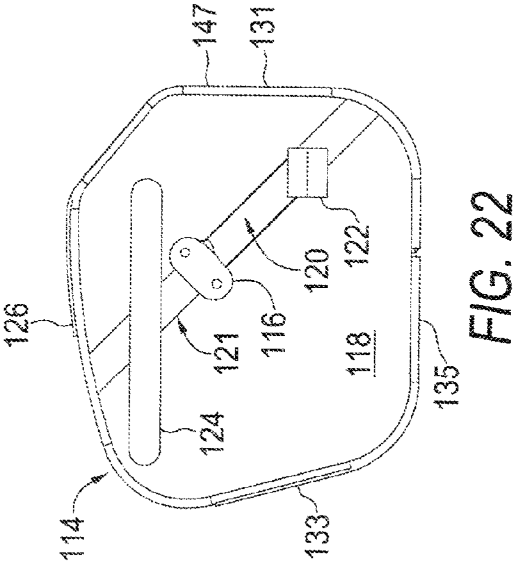
FIG. 22 is side elevation view of the collapsible basket of FIG. 19.

Each of the end members is substantially the same with the same structure and function. Generally only end member 118 will be discussed in detail with like parts of end member 118.1 having like numbers and the additional designation ".1". As shown in FIG. 22, end member 118 in this example includes an insert 121 which diagonally extends from the top 126 to the side 131. The end member 118 may include a flap member 124 to further secure the insert 121 to the end member 118. The insert 121 includes an extended grooved projection 117 as best shown in FIG. 21A.

A connection bracket 120 is shaped through a grooved housing 137 to slidably receive the grooved projection 117. The groove housing 121 is best shown in FIG. 21A, which shows the connection bracket 120 partially in section. Referring back to both FIG. 19 and FIG. 1, each connection bracket in this example connection bracket 120.1 includes a first connector 116.1 which fastens the connection bracket 120.1 to the support member 100 near the distal end 104 of the support member 100. The connection bracket 120.1 includes a second connector 122.1 spaced-apart from the first connector 116.1 by the grooved housing 137.1. The second connector 122.1 fastens the connection bracket 120.1 to the rod 106. Connection bracket 120 is substantially similar corresponds to the corresponding support member 102 and rod 105. The collapsible basket 114 is thereby slidably securable with and removable from the walker apparatus 20.

Figure 23:
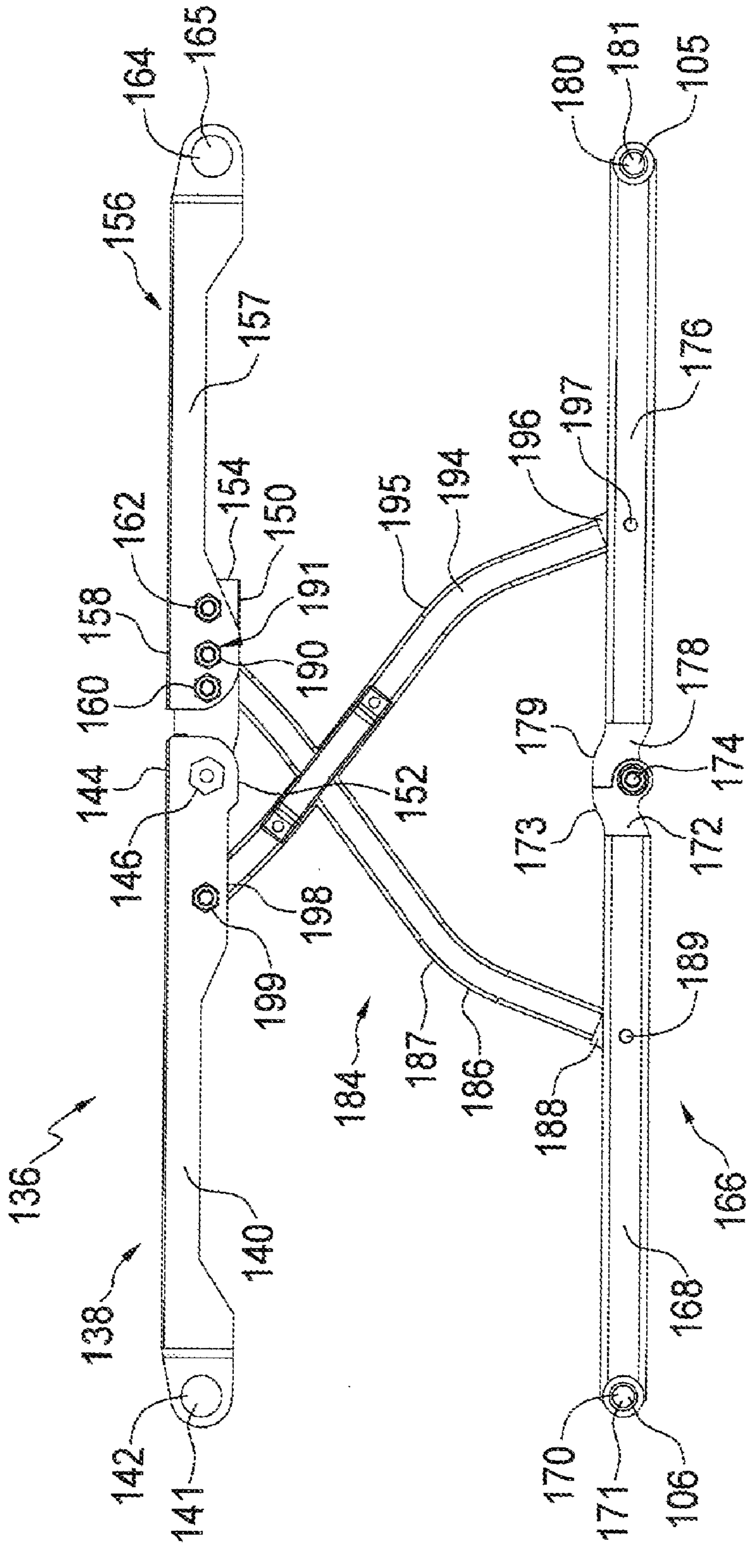
FIG. 23 is a front elevation view of a folding mechanism in an extended mode, according to one embodiment of the invention.
Figure 24:
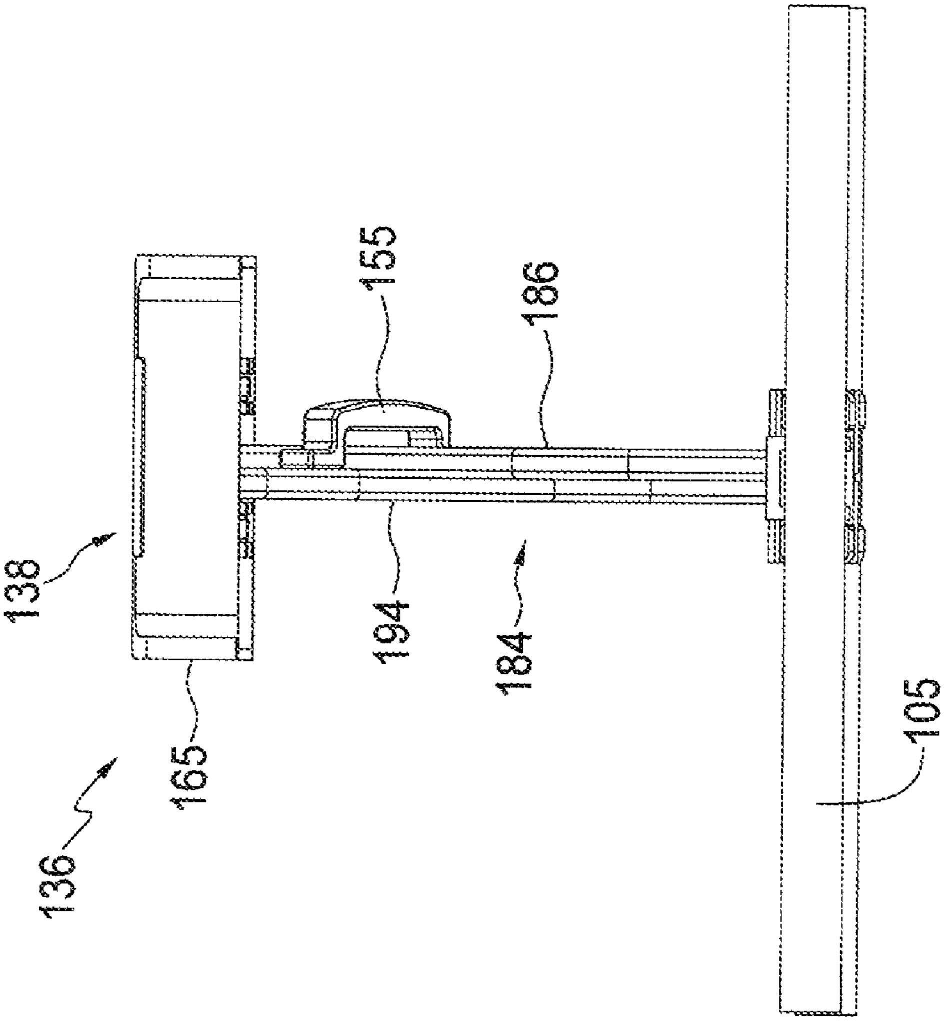
FIG. 24 is a side elevation view of the folding mechanism of FIG. 23.
Figure 25:
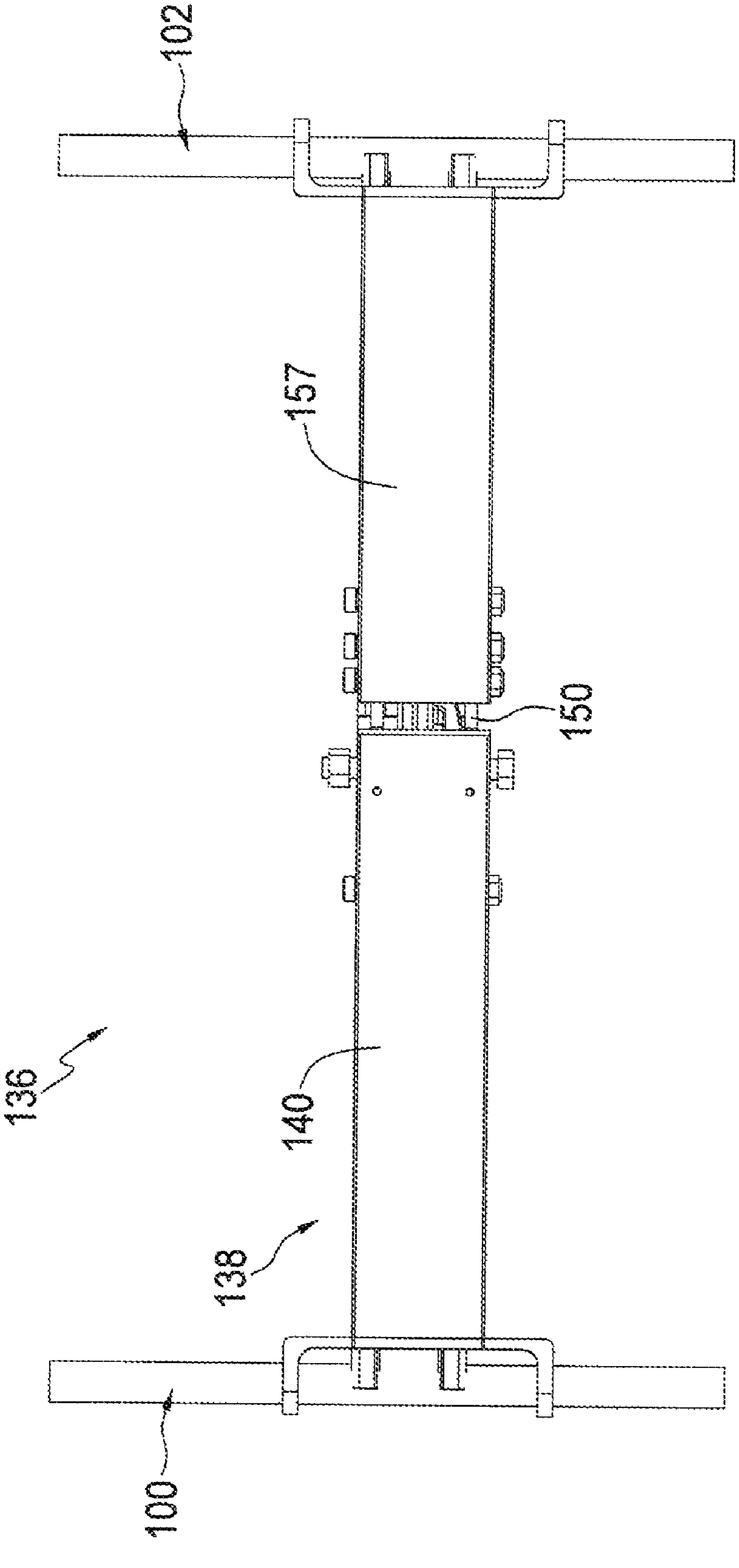
FIG. 25 is a top plan view of the folding mechanism of FIG. 23 in the extended mode.

The walker apparatus 20 includes a folding mechanism 136 as best shown in an unfolded mode in FIGS. 23 to 25. The folding mechanism may be referred to as a means for bringing together the frame members 22 and 24 for folding the walker. The folding mechanism 136 includes a pair of spaced-apart inner frame members 138 and 166. Inner frame member 136 includes a first part 140 and a second part 157. The first part 140 has a first end 142 that pivotally receives and thereby pivotally connects to the support member 100 via a first extended pivot rod 141, as shown by FIG. 23 in combination with FIG. 1. The first part 140 has a second end 144 spaced-apart from the first end 142. A pivot 146 at the second end 144 pivotally connects the first part 140 to a hinge member 150.

The second part 157 includes a first end 158 with a bolt 160 that connects the second part 157 to the hinge member 150. Bolt 162 near the first end 158 also connects the second part 157 to the hinge member 150. The first part 140 and the second part 157 of the inner frame member 138 are thereby hingedly connected together. The second part 157 has a second end 164 which is spaced-apart from the first end 15. The second end pivotally receives and thereby pivotally connects to the support member 102 via a second extended pivot rod 165, as shown by FIG. 23 in combination with FIG. 1.

The inner frame member 166 includes a first part 168 and a second part 176 that are pivotally connected together via pivot 174. The first part 168 has a first end 170 with a connector 171 that pivotally receives and thereby pivotally connects with the rod 106. The first part 168 has a second end 173 with teeth 172 extending therefrom above and over top of the pivot 174. The second part 176 has a first end 179 with teeth 178 extending therefrom above and over top of the pivot 174. The teeth 172 and 178 are positioned to inter-engage in an over-the-center action in the extended mode and thereby inhibit further movement of the inner frame members towards the lower ends of the outer frame members. The second part has a second end 180 with a connector 181 that pivotally receives and thereby pivotally connects with the rod 105.

The folding mechanism 136 includes a pair of link members 184 including a first link member 186 and a second link member 194 which form an x-shaped arranged when fully open. The first link member 186 pivotally connects at a first end 188 via pivot 189 to the first part 168 of the inner frame member 166. The first link member 186 pivotally connects at a second end 190 via pivot 191 to the second part 157 of the inner frame member 157 near the first end 158. The first link member 186 includes a bend 187 that extends outwardly towards the adjacent outer frame member 22. In this example, the bend 187 extends towards the first end 142 of the first part 140 of the inner frame member 138.

The second link member 194 pivotally connects at a first end 196 via pivot 197 to the second part 176 of the inner frame member 166. The second link member 194 pivotally connects at a second end 198 via pivot 199 to the first part 140 of the inner frame member 138 near the second end 144. The second link member 194 includes a bend 195 that extends outwardly towards the outer frame member 24. In this example, the bend 195 extends towards the second end 164 of the second part 157 of the inner frame member 138. A square bracket 155 outwardly extends from the second link member 194 to enable the first link member 186 to slidably pass therethrough. The pair of link members 184 thereby diagonally extend between and operatively connect the inner frame members 138 and 166 together.

Figure 26:
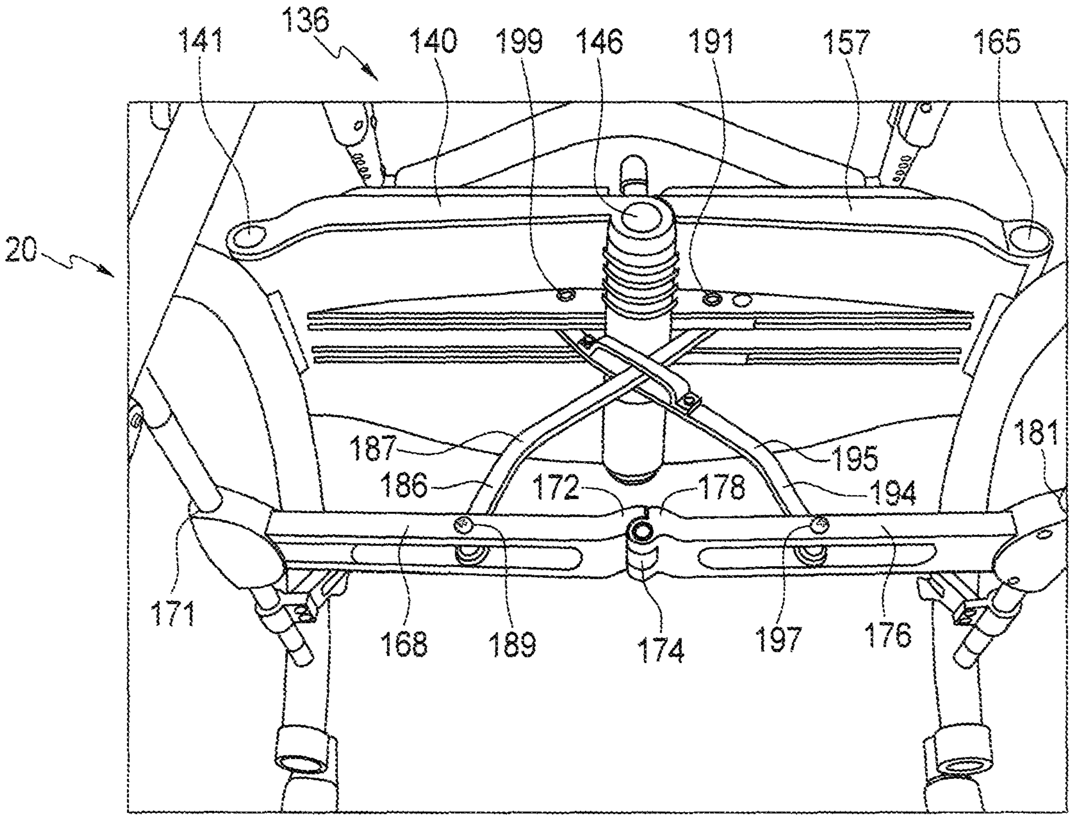
FIG. 26 is a rear, bottom perspective view of the folding mechanism in the extended mode together with the walker apparatus.
Figure 27:
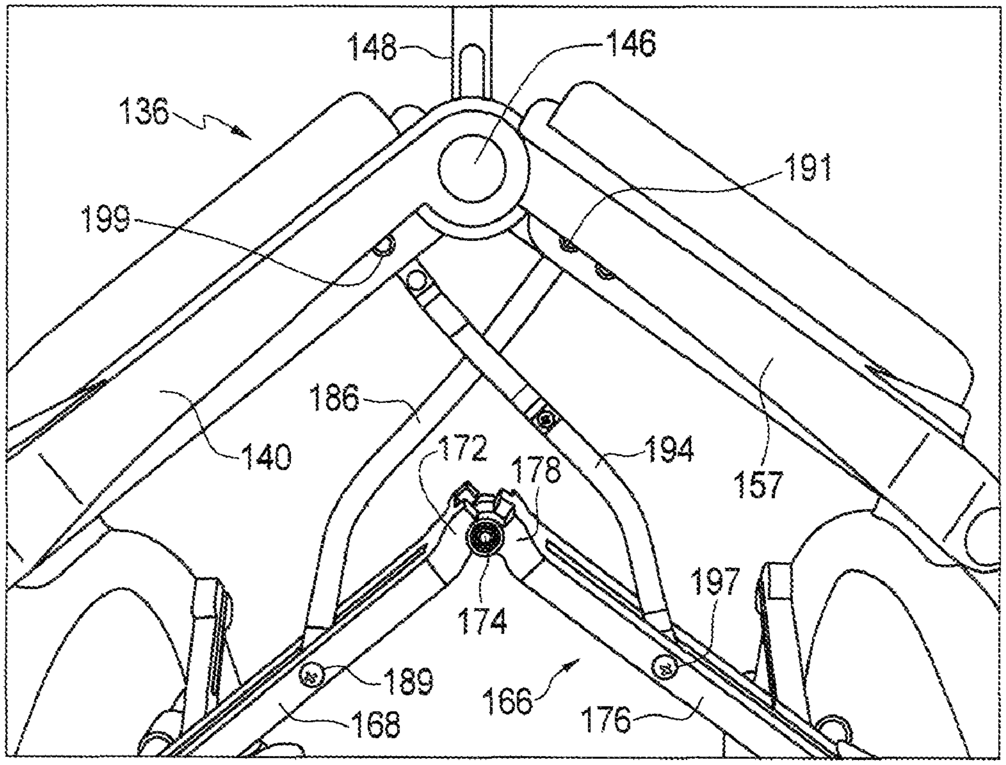
FIG. 27 is a rear elevation view of the folding mechanism of FIG. 26 in a partially folded mode.
Figure 28:
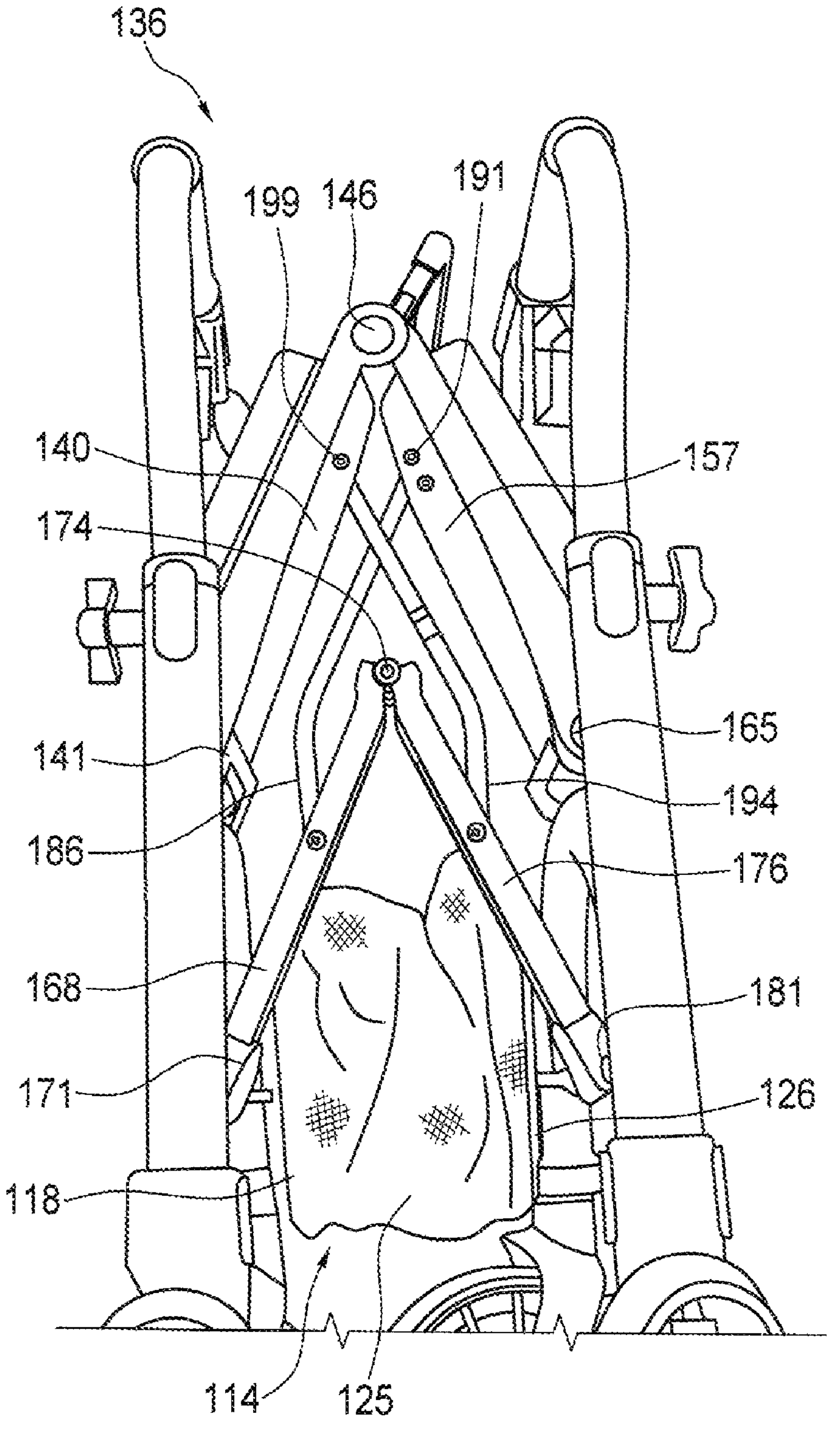
FIG. 28 is a rear elevation view of the folding mechanism and walker apparatus in a fully folded mode.
Figure 29:
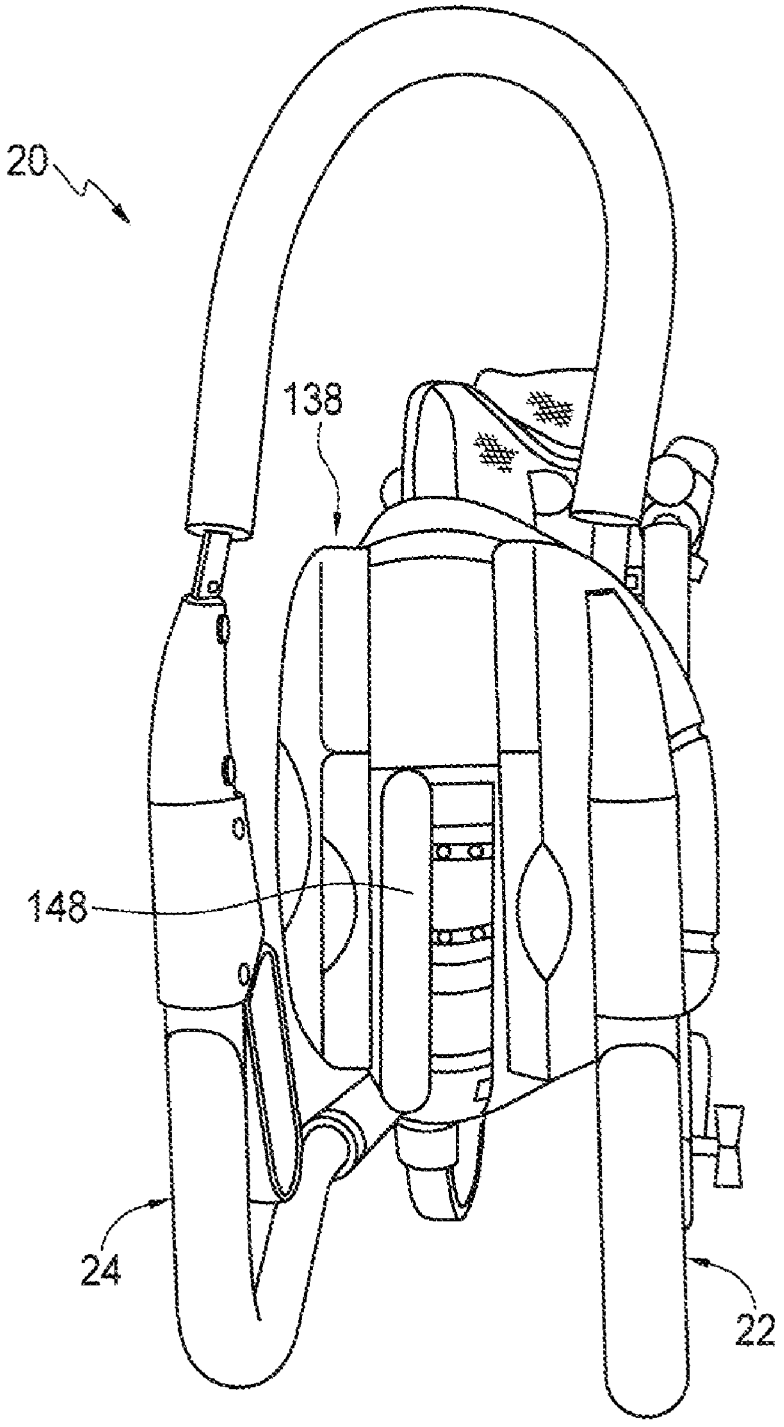
FIG. 29 a top plan view of the walker apparatus illustrated in FIG. 28 in the fully folded mode.
Figure 30:
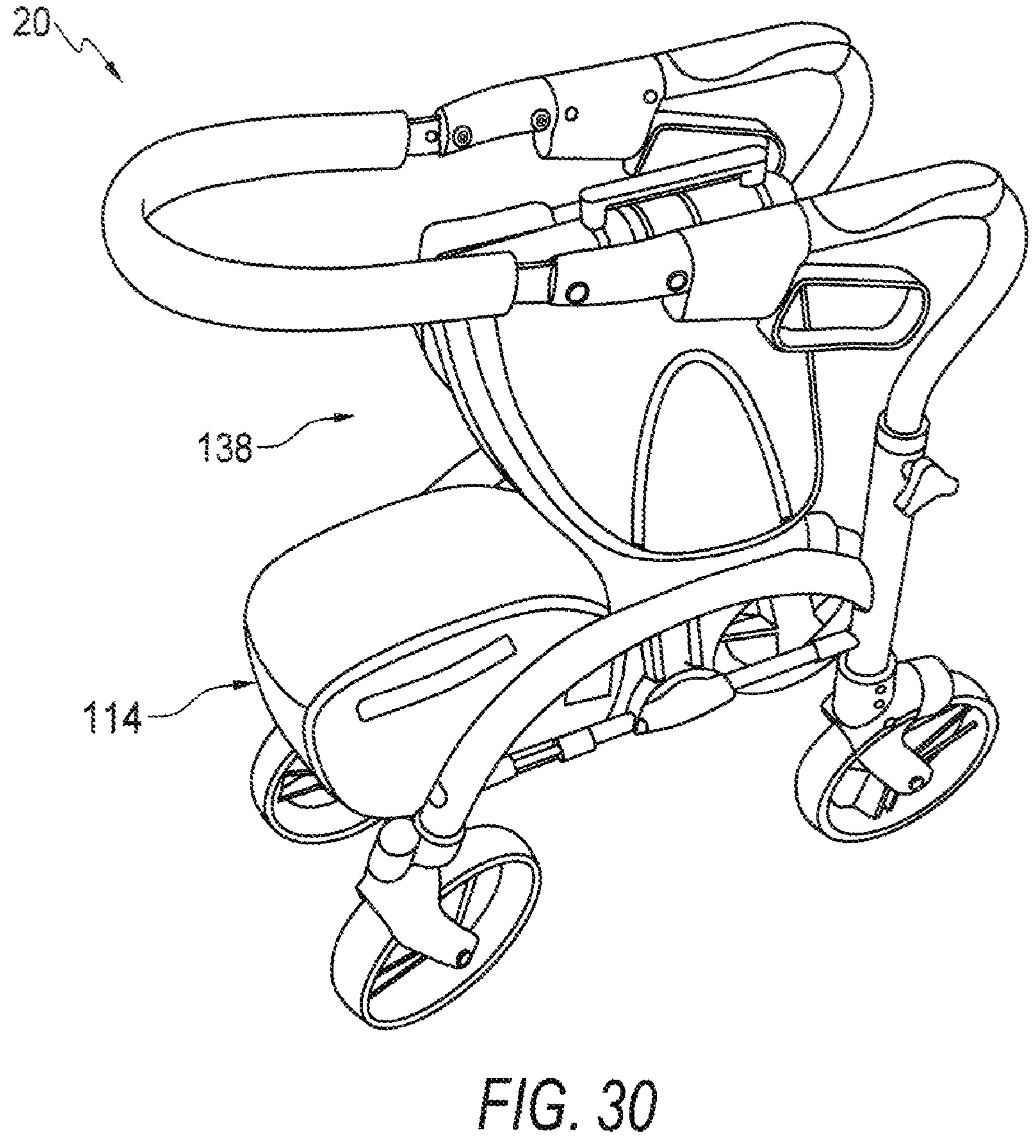
FIG. 30 a top, front isometric view of the walker apparatus in the fully mode.

The operation of the folding mechanism 136 is illustrated in FIGS. 26 to 30. FIG. 26 shows the folding mechanism 136 on the walker apparatus 20 in the unfolded or fully open mode. FIG. 27 shows the folding mechanism 136 in a partially folded mode. The user pulls the seat handle 148 upwards from the perspective of the FIG. 27. This causes the first part 140 and the second part 157 of the inner frame member 136 to fold through pivot 146 together and towards each other. Because the link members 185 and 194 are connected close to the seat handle 148, the actuation of the seat handle 148 also causes the first link member 186 and the second link member 194 to pull the first part 168 and the second part 176 of the inner frame member 166 to fold together and towards each other by means of pivot 174. The inner frame members continue to fold together until a fully folded mode is reached as shown in FIGS. 28 to 30. The foldable walker 20 is thereby laterally folded together in a compact, upright manner, with the outer frames 22 and 24 coming together. Advantageously, the foldable walker 20 may remain standing in the fully folded mode and be moved like a piece of luggage on wheels.

The structure of the present invention provides many advantages. For the brake pad assembly, because both the brake pad mechanism 200 and means 214 for connecting and adjusting are within the brake housing 277, the life of these components is prolonged by the housing, inhibiting the entry of dirt and rocks therein. Also, the brake housing 277 provides a compact, streamline solution for covering the mechanism 200 and means 214 so as to protect the interior against general wear and tear, to inhibit damage from the user's feet, and to inhibit entanglement with the user's clothes, which ensures that the walker apparatus is safer. Conveniently, when the brake pad needs adjusting, the covering portion 261 is readily removable for accessing the means 214.

The brake rod of the present invention provides the advantage of being self-adjusting and without requiring user intervention or being accessible to the user. The gripping member 99 may slide along the brake rod until such time as braking is needed. The gripping member 99 continues to be engageable to operate for braking even if the thumb screw is loose, unscrewed, strip-threaded or otherwise damaged. This provides an added layer of safety for the user as it inhibits the user from tampering with or adjusting the brake rod assembly. It is provides the advantage of ensuring that braking still works when the user needs to brake but, for example, where the walker apparatus has been damaged through an accident, or where the user does not have the sufficient dexterity to make other adjustments.

The frame shape of the walker apparatus, and in particular the support members 100 and 102 with their arc-shape provide the advantage of allowing a light, aircraft-quality aluminum to be used but still maintaining high strength and support requirements. In one example, the structure with the seat 139 resting on the apexes of the support members provides a rated weight capacity of at least 300 lbs. Because the frame locates the seat 139 in the middle of the walker apparatus, that is, halfway between the wheels, the frame thereby provides a walker apparatus that is more stable and therefore safer.

The collapsible basket 114 has the advantage of requiring very few parts: simply two connectable end members each having a rigid peripheral portion with fabric stretching around therebetween. The basket 114 is more user-friendly in that it can remain connected to and need not be removed the walker apparatus when the walker is folded. The basket 114 connects and folds in such a manner as to not comprise the integrity of the support members 100 and 102 or other aspects of the walker frame. Because the sides 131 and 133 are made of netting as opposed to continuous fabric, this allows the basket 114 to fold even more easily.

The folding mechanism provides a structure that better promotes later support and is therefore more robust. The bends 187 and 195 offer more resistance to shear forces acting, for example, against the support members. Because the links 186 and 194 intersect, they inhibit torsional twisting of the frame of the walker apparatus. The inner frame members 136 and 166 further promote lateral support. This means that the folding mechanism only requires two cross links 186 and 194 for its functioning and therefore uses fewer parts. This results in the advantage of providing a folding mechanism that is easier to manufacture and thus less expensive. The bends 187 and 195 also enable the folding mechanism to fold laterally in a more compact manner.

Because the links 186 and 194 are spaced inwardly from the support members 100 and 102, this provides the walker apparatus with a folding mechanism that is more compact and less likely to tangle with the user's clothing. Also, it results in a folding mechanism that is more durable if the walker is dropped or otherwise damaged because the links 186 and 194 are adjacent to the support members 100 and 102 and seat 139.

Those skilled in the art will appreciate that many variations are possible within the scope of the inventive aspects of the walker apparatus. For example, instead of the folding mechanism 136, other means may be used for bringing together the frame members for folding the walker, as are known to those skilled in the art, for the non-folding inventive aspects of the walker apparatus.

For aspects of the invention other than the brake rod, those skilled in the art will appreciate that, instead of a brake rod, other means for actuating a brake pad mechanism may be used for the walker apparatus.

The handle bar assembly disclosed in the present invention is just by way of example. Those skilled in the art will appreciate that other means for engaging a brake pad mechanism may be used for the walker apparatus.

Those skilled in the art will appreciate that, instead of the brake pad mechanism 211, other brake pad means for braking at least one of the wheels may be used for the walker apparatus for its non-brake pad and non-brake housing inventive aspects. Likewise, other means 214 for connecting and adjusting the corresponding brake pad may be used for the walker apparatus for its non-brake pad and non-brake housing inventive aspects.

It will further be understood by a person skilled in the art that many of the details provided above are by way of example only and can be varied or deleted without departing from the scope of the invention as set out in the following claims.

What is claimed:

1. A walker apparatus comprising:

a pair of spaced-apart, operatively interconnected frame members, the frame members each having an upper end and a lower end spaced-apart from the upper end, the frame members each including telescoping tubes having an adjustment range for adjusting the height of the upper end and a means for locking the telescoping tubes together;

ground-engaging wheels rotatably mounted to the frame members at the lower ends;

a handle bar assembly at the upper ends of the frame members including a gripping handle for squeezing with one's hand, a connection member operatively connected to the gripping handle, and an actuation means for actuating the connection member when the gripping handle is squeezed;

a brake pad means for braking at least one of said wheels, the brake pad means being operatively connected to the lower ends of the frame members, both the actuation means and the brake pad means being disposed within at least one of the frame members; and a self-adjusting brake rod assembly disposed within at least one of the frame members, the brake rod assembly including a brake rod operatively connected to the brake pad means and a gripping member operatively connected to the connection member, the gripping member remaining adjacent to the brake rod throughout the adjustment range of the telescoping tubes, the gripping member being spring-biased to remain free of the brake rod in a non-actuated mode and, when the gripping handle of the walker is squeezed to actuate the connection member, the gripping member is thereby actuated to engage and thereby actuate the brake rod, the brake pad means braking at least one of said wheels upon actuation of the brake rod.

2. The apparatus as claimed in claim 1, wherein the gripping member includes a plate having a first end, a second end spaced-apart from the first cud and an aperture near the second end, the plate connecting to the connection member near the first end and the plate slidably receiving the brake rod through the aperture near the second end, the plate tilting with the first end elevated relative to the second end when the gripping member is actuated, thereby causing the plate to engage with and abut the brake rod for thereby actuating the brake rod.

3. The apparatus as claimed in claim 2, wherein the connection member is made of wire.

4. The apparatus as claimed in claim 1, where in the brake rod is hexagonal.

5. The apparatus as claimed in claim 1, where in the brake rod is hexagonal.

6. A walker apparatus comprising: a frame member; a ground-engaging wheel rotatably mounted to the frame member; a braking handle; a connection member operatively connected to the braking handle; a brake for braking the wheel; and a self-adjusting brake rod assembly disposed within the frame member, the brake rod assembly including a brake rod operatively connected to the brake, a gripping member operatively connected to the connection member, the gripping member having a first end, a second end spaced-apart from the first end and an aperture near the second end, the gripping member connecting to the connection member near the first end and the gripping member slidably receiving the brake rod through the aperture near the second end, a first spring biasing the gripping member near the first end of the gripping member, and a second spring biasing the gripping member near the second end of the gripping member, whereby the gripping member is spring-biased to remain free of the brake rod in a non-actuated mode and, when the braking handle is squeezed to actuate the connection member, the gripping member tilts with the first end being elevated relative to the second end, thereby causing the gripping member to engage with and abut the brake rod for thereby actuating the brake rod, the brake braking the wheel upon actuation of the brake rod.

7. The apparatus as claimed in claim 6, wherein the first spring extends about the brake rod.

8. The apparatus as claimed in claim 6, wherein the second spring extends about the connection member.

9. The apparatus as claimed in claim 6, wherein the connection member is a brake wire and wherein the gripping member further includes a clamp that engages the brake wire via a set screw.

* * * * *

UNITED STATES PATENT AND TRADEMARK OFFICE

CERTIFICATE OF CORRECTION

PATENT NO. : 8,251,380 B2
APPLICATION NO. : 13/276518
DATED : August 28, 2012
INVENTOR(S) : Julian Liu It is certified that error appears in the above-identified patent and that said Letters Patent is hereby corrected as shown below:

Column 14, (claim 2) lines 32-41, should read as follows:

Claim 2. The apparatus as claimed in claim 1, wherein the gripping member includes a plate having a first end, a second end spaced-apart from the first end and an aperture near the second end, the plate connecting to the connection member near the first end and the plate slidably receiving the brake rod through the aperture near the second end, the plate tilting with the first end elevated relative to the second end when the gripping member is actuated, thereby causing the plate to engage with and abut the brake rod for thereby actuating the brake rod.

Signed and Sealed this
Thirteenth Day of November, 2012

David J. Kappos

David J. Kappos
*Director of the United States Patent and Trademark Office*